(12) United States Patent
Reed et al.

(10) Patent No.: US 12,012,471 B2
(45) Date of Patent: Jun. 18, 2024

(54) DEVICE AND METHODS TO ACTIVELY CONTROL THE PRODUCTION OF MULTI-STAGE POLYMER PRODUCTION

(71) Applicant: YOKOGAWA FLUENCE ANALYTICS, INC., Stafford, TX (US)

(72) Inventors: Wayne Frederick Reed, New Orleans, LA (US); Michael Felix Drenski, New Orleans, LA (US); Natalie Leonardi, New Orleans, LA (US)

(73) Assignee: YOKOGAWA FLUENCE ANALYTICS, INC., Stafford, TX (US)

( * ) Notice: Subject to any disclaimer, the term of this patent is extended or adjusted under 35 U.S.C. 154(b) by 421 days.

(21) Appl. No.: 16/329,147

(22) PCT Filed: Aug. 31, 2017

(86) PCT No.: PCT/US2017/049732
§ 371 (c)(1),
(2) Date: Feb. 27, 2019

(87) PCT Pub. No.: WO2018/045231
PCT Pub. Date: Mar. 8, 2018

(65) Prior Publication Data
US 2019/0194360 A1 Jun. 27, 2019

Related U.S. Application Data

(60) Provisional application No. 62/382,062, filed on Aug. 31, 2016.

(51) Int. Cl.
*C08F 2/00* (2006.01)
*B01J 19/00* (2006.01)
(Continued)

(52) U.S. Cl.
CPC ............ *C08F 2/001* (2013.01); *B01J 19/0033* (2013.01); *C08F 2/00* (2013.01); *C08F 20/56* (2013.01);
(Continued)

(58) Field of Classification Search
CPC .. C08F 2500/05; C08F 2400/02; C08F 20/56; C08F 2/00; C08F 2/001; G01N 11/04;
(Continued)

(56) References Cited

U.S. PATENT DOCUMENTS 3,972,804 A * 8/1976 McLaughlin .......... C10G 49/26
  208/108
3,974,064 A * 8/1976 Bajek .................... C10G 35/24
  208/134

(Continued)

FOREIGN PATENT DOCUMENTS

JP   2009-508995 A   3/2009
WO   2016054138 A1   4/2016
(Continued)

OTHER PUBLICATIONS

Supplementary European Search Report issued on Dec. 3, 2019 for corresponding European Application No. 17847586.
(Continued)

*Primary Examiner* — Shogo Sasaki
(74) *Attorney, Agent, or Firm* — Polsinelli PC

(57) ABSTRACT

Devices and methods for actively controlling the production of multistage and multimodal polymers. The device may include a reaction vessel configured to contain a polymer solution and generate polymer reactions in at least two stages as well as one or more detectors configured to monitor at least one reaction characteristic of the polymer solution contained in the reaction vessel. The device may further include a controller coupled with the reaction vessel and the
(Continued)

one or more detectors, the controller configured to actively control the development of a predetermined reaction characteristic by modifying at least one process control variable based on the at least one reaction characteristic monitored by the detector.

8 Claims, 12 Drawing Sheets

(51) Int. Cl.
      *C08F 20/56*     (2006.01)
      *C08G 85/00*     (2006.01)
      *G05B 13/04*     (2006.01)
      *G06F 17/11*     (2006.01)
      *G01N 11/04*     (2006.01)
      *G01N 21/65*     (2006.01)

(52) U.S. Cl.
    CPC ............. *C08G 85/00* (2013.01); *G05B 13/04* (2013.01); *G06F 17/11* (2013.01); *C08F 2400/02* (2013.01); *C08F 2500/05* (2013.01); *G01N 11/04* (2013.01); *G01N 21/65* (2013.01)

(58) Field of Classification Search
    CPC ........ G01N 21/65; C08G 85/00; G05B 13/04; G06F 17/11; B01J 19/0033
    See application file for complete search history.

(56) References Cited

U.S. PATENT DOCUMENTS

| | | | | |
|---|---|---|---|---|
| 4,469,853 A | * | 9/1984 | Mori ........................ | B01J 8/001 526/59 |
| 6,042,790 A | * | 3/2000 | Hottovy ............... | B01J 19/0006 422/110 |
| 2005/0228543 A1 | | 10/2005 | Parrish et al. | |
| 2005/0267267 A1 | | 12/2005 | Sandell et al. | |
| 2006/0025491 A1 | * | 2/2006 | Adkins ................. | C08F 283/06 521/155 |
| 2008/0216563 A1 | | 9/2008 | Reed et al. | |
| 2010/0144967 A1 | | 6/2010 | Parrish et al. | |

FOREIGN PATENT DOCUMENTS

| | | |
|---|---|---|
| WO | WO-2016/118507 A1 | 7/2016 |
| WO | 2018045231 A1 | 3/2018 |

OTHER PUBLICATIONS

International Search Report and Written Opinion; PCT Application PCT/US2017/049732; mailed Dec. 14, 2017.

Japanese notice of reason for refusal; dated Feb. 29, 2024; application # 2019-511938.

\* cited by examiner

DEVICE AND METHODS TO ACTIVELY CONTROL THE PRODUCTION OF MULTI-STAGE POLYMER PRODUCTION

CROSS-REFERENCE TO RELATED APPLICATIONS

This application is a National Stage Entry of PCT/US2017/049732, entitled "Device and Methods to Actively Control the Production of Multi-Stage Polymer Production," filed Aug. 31, 2017, which claims priority to U.S. Provisional Appl. No. 62/382,062, filed Aug. 31, 2016. The contents of all aforementioned applications are incorporated herein by reference, for all purposes, in their entirety.

FIELD

The present application is directed to controlling the production of polymers. Specifically, the present disclosure is directed to devices and methods for actively controlling the production of multistage and multimodal polymers.

BACKGROUND

Modified polymers and polymer blends are frequently produced in laboratories and in polymer manufacturing. Modified polymers may be produced in stages. As a non-limiting example, a polyacrylamide homopolymer may be made by free radical polymerization in a first stage, and then hydrolyzed with a base such as NaOH to form a copolymeric polyelectrolyte consisting of neutral Am groups and anionic COO— groups. There are many other cases of modified polymers using two or more process steps. The types of modifications can include, but are not limited to sulfonation, PEGylation, amination, quaternization, hydroxylation, branching, multi-block extensions, grafting, cross-linking, dendrimerization, production of stars and other branched structures of well-defined architecture, hybridization of polymers with nanoparticles and microparticles, such as, but not limited to silica, titanium dioxide, pure metals, metal oxides, clay, and other materials.

Multimodal polymers, which can resemble blends, are produced in two or more stages, each stage yielding a distinct polymer with its own properties and distributions. For example, a polymer with a high molecular weight mode can confer mechanical strength to a product, such as a plastic, whereas combining in a second mode of distinctly lower molecular weight can aid in fabrication steps for the multimodal polymer, such as extrusion molding. Other instances of multimodal polymers include plasticizers, compatibilizers, and viscosity and combustion byproduct control agents frequently found in motor oil formulations. Yet other instances include mixing of incompatible polymers which lead to the formation of desired nano- or microstructures or of a macroscopic phase separation. An example is high impact polystyrene where incompatible polybutadiene, with or without polystyrene grafts, exists with polystyrene, forming rubbery micro-inclusions giving impact, flexibility, and crack resistance.

BRIEF DESCRIPTION OF THE DRAWINGS

Embodiments of the present application are described, by way of example only, with reference to the attached Figures, wherein.

Figure 1:
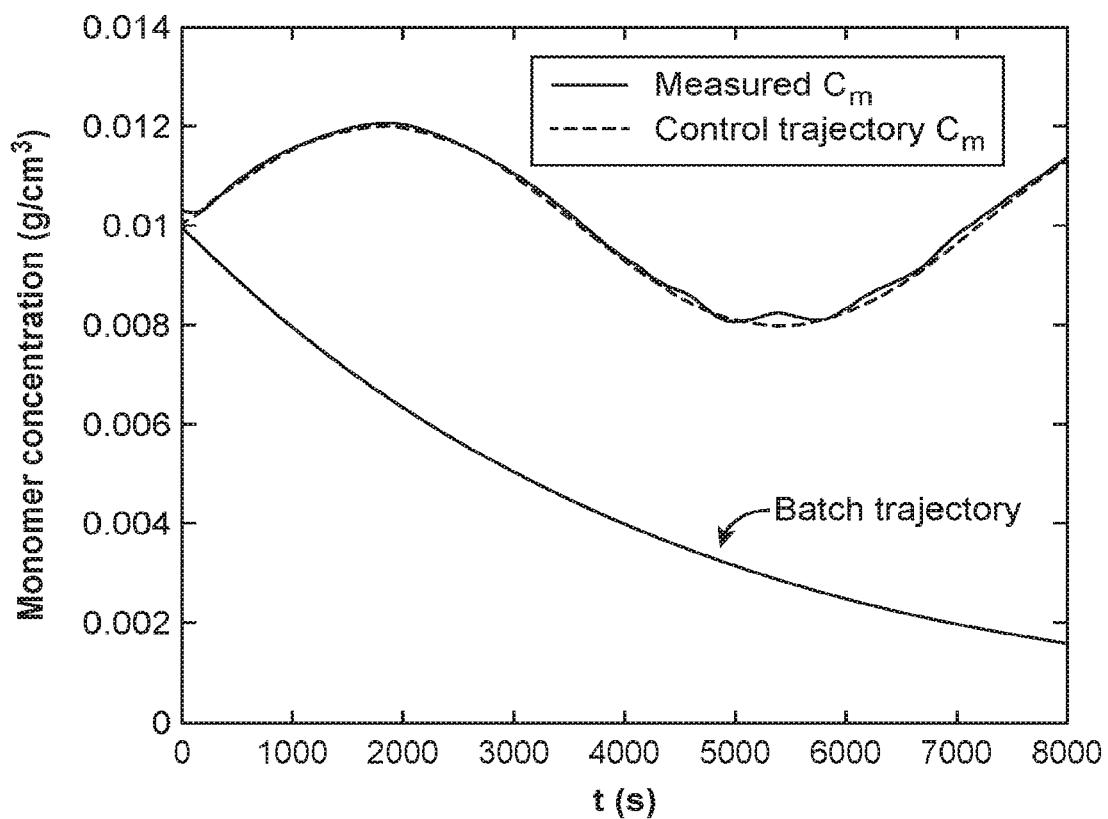
FIG. 1 illustrates an experimental result of automatic control of monomer concentration using sinusoidal control of monomer concentration during free radical polymerization, in comparison with the monomer trajectory for a batch reaction with no monomer feed, according to an example embodiment of the present disclosure.

It should be understood that the various aspects are not limited to the arrangements and instrumentality shown in the drawings.

SUMMARY

The present disclosure provides devices and methods for actively controlling the production of multistage and multimodal polymers. According to the present disclosure, actively controlled multistage polymer production can produce polymers of increasing complexity as well as coexisting multimodal polymers. In the first case, active control allows sequential processes that add or change polymer features at each new stage, termed 'modified polymers,' for simplicity. In the second case, actively controlled stages produce 'multimodal polymers,' mixtures of polymers of distinctly different properties, that would normally have to be produced by blending different polymer lots together. The two cases can also co-exist where a sequentially produced modified polymer co-exists with multimodal polymers.

When multimodal polymers are produced, there are associated multimodal distributions. The multimodal distributions can comprise, but are not limited to, molecular weight (MWD), intrinsic viscosity (IVD), composition (CD), tacticity (TD), branching (BD), and others. Modified and multimodal polymers are produced sequentially in batch or semi batch reactions, wherein the desired properties of each mode of the modified polymer are specified, and then an active controller guides the production of each mode in sequence. The active controller can be either of a manual or fully automatic type. The presently disclosed method includes the use of a device that can frequently furnish the values of the mode characteristics being produced, for instance, molecular weight, IV, and composition. Multimodal polymers in some instances are equivalent to the blending of polymers of different types. Because the multimodal method occurs all in one reactor, or a series of reactors, it does not require the energy and time intensive steps associated with blending polymers from different batches. In contrast, modified polymers produced by this method cannot be achieved by merely blending different polymers together.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. A person skilled in the relevant art will recognize that other components and configurations may be used without parting from the spirit and scope of the disclosure. It should be understood at the outset that although illustrative implementations of one or more embodiments are illustrated below, the disclosed apparatus and methods may be implemented using any number of techniques. The disclosure should in no way be limited to the illustrative implementations, drawings, and techniques illustrated herein, but may be modified within the scope of the appended claims along with their full scope of equivalents. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented. The term "coupled" is defined as connected, whether directly or indirectly through intervening components, and is not necessarily limited to physical connections. The term "communicatively coupled" is defined as connected, either directly or indirectly through intervening components, and the connections are not necessarily limited to physical connections, but are connections that accommodate the transfer of data between the so-described components. The connections can be such that the objects are permanently connected or releasably connected. The terms "comprising," "including" and "having" are used interchangeably in this disclosure. The terms "comprising," "including" and "having" mean to include, but are not necessarily limited to, the things so described.

As used herein, the term "polymer reaction" refers to any type of chemical or physical reaction which involves polymers. The term "polymer reaction" includes, but is not limited to, covalently producing polymers from monomers or comonomers (to produce statistical or random copolymers), causing branching or cross-linking reactions, causing breakage of polymer bonds to produce smaller polymers, causing formation of block copolymers, causing formation of star, comb, dendritic, cyclic or other highly specific polymer architectures, any type of reaction causing chemical modification of polymers, such as, but not limited to, imbuing a polymer with negative and/or positive electrical charge, with zwitterions, with polar groups, imbuing a polymer with acid or base properties, linking polymers to, or growing polymers from nano- or microparticles such as silica, metals such as silver or gold, gels, metal oxides such as titanium dioxides, clay, etc., and causing reversible or irreversible supramolecular assemblage of polymers and other particles.

In terms of reactions producing polymers from monomers, there is no restriction on what type of polymerization mechanism is used. Hence, chain growth and step growth reactions are included. In the former are free radical and controlled radical polymerization. Controlled radical polymerization may include methods such as, but not limited to, ring opening metathesis polymerization (ROMP), atom transfer radical polymerization (ATRP), reversible addition fragmentation transfer polymerization (RAFT), and nitroxide mediated polymerization (NMP). Polymer reactions can occur in solvents, bulk, and in heterogeneous phases such as micelles, emulsion, inverse emulsions, and dispersions. Metallocene based chain growth is included, such as is used in polyolefins. Step growth includes polycondensation reactions such as used in the production of polypeptides, polynucleotides, polyimides, polyamides, and polyurethanes.

The present disclosure places no fundamental limitations on the types of polymer reactors to which it applies. As used herein, the terms "polymer reactors," also termed "polymer reaction vessels," refers to a reactors or reactions vessels that can be as small as milliliters or less and as large as tens or hundreds of thousands of liters. They can be made of many different materials, including, but not limited to, metals such as stainless steel or aluminum, glass, porcelain, and ceramics. They can be of a batch type, of the type where reagents can be fed in, sometimes termed 'semi-batch', or continuous. If continuous reactors are used, the devices and methods of the present disclosure may be applied differently according to the type of continuous reactor. In long tubular continuous reactors, for example, different actively controlled process stages can occur at different points along the reacting fluids trajectory through the reactor. In continuously stirred tank reactors a steady state is reached in the reactor and multiple CSTR can be placed in serial flow to reach different stages in the actively controlled multi-stage process.

As used herein 'multistage polymer' is a polymer whose properties are modified in two or more processing stages. It can also be referred to as a 'modified polymer'. A multistage polymer acquires different characteristics in each stage, but is built off of polymers in preceding stages. This distinguishes 'multistage polymer from a 'multimodal polymer' in which distinct new polymers are produced in succeeding process stages and coexist with polymer produced in previous stages. Of course, in some instances, both multistage polymers and multimodal polymers can be produced in the same set of processes, such as, for example, when succeeding process stages not only produce new polymers, but modify the previously produced polymers.

As used herein, the term "mode" refers to a unimodal distribution of a characteristic, such as molecular weight (MW) or composition. According to the present disclosure, the concentration of a polymer population, or the mass of the population or the fraction of the mass of the population, is a function of the characteristic. For example, x may be the characteristic and $C_p(x)$ may be the concentration of polymers with that characteristic. A unimodal MWD, such as that which results from the geometric chain length distribution, may be considered. Normally a single mode, continuous distribution will have two inflection points in the distribution, that is two points where $d^2C(x)/dx^2=0$.

As used herein, "multimodality" occurs when at least two modes are present in the polymer population. The requirement for multimodality, according to the present disclosure, is that there be at least two distinct processes to produce two distinct modes, the polymers of each mode being distinguishable from the other mode. It is not necessary that the combined polymer modes be physically separable from each other, merely that they exist together due to their production in sequence. In other words, a physical separation method might not exist to physically separate the modes, but by virtue of the two distinct processes creating each mode they exist together.

There are a number of methods for separating polymers according to their characteristics, such as molecular weight, composition, and branching. These methods include, but are not limited to, Gel Permeation Chromatography (GPC), Size Exclusion Chromatography (SEC), field flow fractionation (FFF), matrix assisted laser desorption ionization time of flight mass spectroscopy (MALDI-TOF), Fourier Transform Mass Spectrometry, and coupled methods, such as, but not limited to, two dimensional GPC/SEC, and variations on chromatography such as CRYSTAF and temperature rising elution fractionation (TREF).

The present disclosure provides devices and methods for actively controlling the production of multistage and multimodal polymers. In particular, the present disclosure provides devices and methods for producing multimodal polymers in a single reactor, without having to blend different polymer lots together. The present disclosure also provides devices and methods for sequentially producing a modified or multistage polymer.

In order to achieve the active control necessary for producing modified polymers and multimodal polymers it is necessary to be able to monitor the reaction characteristics to be controlled, and to monitor them with sufficient frequency to allow for control. In the case where composition is to be controlled, it is necessary to be able to distinguish and monitor the course of conversion of the comonomers involved. Sufficiently frequent measurements can be made in some instances by in-reactor spectroscopic probes, such as Raman scattering and infra-red. Within the ACOMP platform distinguishing of comonomer has been accomplished with refractive index, ultra-violet absorption, near IR, NMR, and conductivity. Where chiral molecules are mixed with achiral molecules the former can be distinguished with a polarimeter or other sensor of optical activity, such as circular dichroism or circular birefringence.

In order to measure molecular weight ACOMP uses total intensity light scattering, multi-angle when required (i.e. when the z-average root mean square radius of the polymers is an appreciable fraction of the wavelength of the incident light), together with polymer concentration determination. Intrinsic viscosity (IV) is also related to molecular weight and a capillary type viscometer is frequently used in the ACOMP detector train. When IV is combined with molecular weight it can also be used to assess branching. Simultaneous low and high shear viscosity measurements in ACOMP can also be used to assess branching via shear non-Newtonian shear behavior.

In order to carry out active control, information on the reaction characteristics must be available with sufficient frequency to allow control actions to be taken in time intervals that are short compared to the time of the entire reaction. Stated another way, the frequency of data acquisition has to be such that control of the desired reaction characteristics is carried out in a time much less than the time on which a substantial deviation of the controlled characteristics can occur. 'Substantial deviation' depends on the degree to which control is desired. For example, not limiting, in some cases controlling the desired characteristics to within 35% of the target trajectory may be acceptable, whereas in other cases, control to within 10%, 5%, or even less than 1% deviation may be required. Sufficient frequency of reaction characteristic information is hence such, that it must be frequent enough to control the characteristic within the desired bounds of deviation from the target trajectory. A target trajectory for a reaction characteristic, such as $M_w$, IV, or composition is normally established offline in order to optimize end product characteristics and optimize the processes leading to these. The target trajectory is then implemented and followed by active control means during a polymer reaction process.

For example, a typical ACOMP system makes measurements of multiple reaction characteristics, such as Mw, reduced viscosity, conversion, monomer and polymer concentrations, and comonomer composition once per second. Faster and slower rates are possible but this gives a general sense of frequency in reactions that typically last tens of minutes or several hours. In fact, when the period of data measurements (the inverse of the frequency) is well within the time scale needed to control deviations such measurements are often termed 'continuous', as in the term "Automatic Continuous Online Monitoring of Polymerization (ACOMP)" reactions. Manual sampling methods, such as are widely employed both in the polymer manufacturing industry and in research laboratories seldom have high enough frequency for active control. Similarly, online chromatographic methods generally do not have sufficient frequency either, although they could be employed according to the present disclosure.

Control of the trajectory of one or more reaction characteristics (e.g., molecular weight, composition, branching, degree of hydrolysis, and chemical substitution) can be controlled by process control variables, also termed 'reaction control variables', such as, but not limited to, temperature, mixing, and feeding into the reactor at least one of the following: monomers, comonomers, branching agents, cross-linking agents, chain transfer agents, inhibitors, gases such as air, $O_2$, $N_2$, and argon, acids, bases, redox agents, and catalysts.

The active control of one or more reaction variables during a reaction stage can be accomplished by one of three means according to the present disclosure. First, in 'manual active control' a human has access to the data of the relevant characteristics of sufficient frequency, on which said human follows a specified reaction target trajectory for one or more relevant characteristic by manually controlling one or more process control variables, as described above. Secondly, a computational algorithm may be used to direct which control variables should be manually controlled by the operator, allowing for 'computationally assisted active control.' Thirdly, the process control variables may be controlled automatically via a computationally based controller allowing for automatic active control.

Process control variables may also be controlled based on the reaction trajectories as determined by the reaction characteristic monitoring. As used herein, the term 'reaction trajectory' refers to the specific mathematical form of a reaction characteristic, such as MW, IV, or composition, versus a dependent variable. The most common dependent variables in polymerization reactions are time and polymer concentration, but can include others, such as composition, degree of branching, etc. The reaction trajectory will determine the final characteristics of the polymer, including all of its unimodal or multimodal characteristics. Hence, by controlling the reaction trajectory, the characteristics of the final polymer are controlled.

Normally, the reaction trajectory will be actively controlled to follow a target trajectory as closely as possible. While target trajectories are often conceived as those involving a reaction characteristic versus time or versus concentration, or other variable in a batch or semi-batch reactor, the concept also applies to continuous reactions. Continuous reactors normally operate at a steady state to continuously produce a certain grade of polymer, that is, a polymer with defined physical and chemical characteristics. When a reactor changes grades of polymer in production, wherein a 'grade' is equivalent to a 'mode' as used in this disclosure, it is necessary to pass from one steady state to another, requiring different operating conditions, such as feed rates of comonomers, catalysts, other reagents, temperature, pressure, etc. During the changeover, which is similar to producing a different mode of polymer, polymer produced between the two grades is often rejected, since it doesn't meet the specification of either grade, leading to considerable waste of energy, feedstocks, and time. An optimal cross-over target trajectory can be determined offline and implemented online, such that, by active control, the time, material and energy used in grade crossover is minimized.

A specific reaction characteristic may be considered, such as, but not limited to, the cumulative weight average molecular weight $M_w$, which can be measured frequently or continuously during polymer synthesis by a method such as ACOMP, and a general characteristic X may be further considered. The online monitoring of reactor contents yields the cumulative value of X in the reactor $X_c$. The buildup of X and its resulting distribution depend on the instantaneous value of X, $X_{inst}$, and how much polymer concentration of $X_{inst}$ is added to the accumulating population. Concretely, the relationship between $X_c$ and $X_{inst}$ is, by definition $$X_c(C_p) = \frac{\int_0^{C_p} X_{inst}(C_p')dC_p'}{C_p}. \quad (1)$$

$M_w(C_p)$ is measured directly from light scattering and concentration detectors in the ACOMP system. $M_{w,inst}(C_p)$ can be computed from the ACOMP value of $M_w(C_p)$ according to equation 1 by $$M_{w,inst}(C_p) = \frac{d[C_p M_w(C_p)]}{dC_p}. \quad (2)$$

Computation of $M_{w,inst}$ from the primary ACOMP values of $M_w$ and $C_p$ allows the instantaneous weight average of the MWD to be followed, and a histogram representation of the MWD to be made as synthesis proceeds. $X_c$ in equation 1 can represent any other characteristic, such as IV, composition, etc. Up to this point, all quantities are model-independent and based on primary detector measurements.

The presently disclosed devices and methods may include more than one reactor to achieve the desired modified or multimodal polymers, or mixtures of both. While a single reactor can often be outfitted to provide all the reaction control variables needed to produce the desired polymers, there are many instances where two or more reactors are used, in each of which one or more different stages of the process is carried out. For example, the second stage of a process may involve temperatures, pressures or reagents that a first vessel cannot withstand, making a second reactor necessary. A second reactor may be built with materials and specifications to withstand higher temperature, pressure, corrosive materials, and have higher viscosity mixing capabilities. Multiple such stages may require more than two reactors. The intermediate or final polymeric product in a successive stage may also require special means of handling. For example, in a first or early stage, a polymer intermediate may be pumped because of low enough viscosity, whereas in later or final stage it may be so viscous that it may need to be scooped or scraped. An economy of scale, production throughput, quality, and reduction of maintenance needs can frequently be achieved by having multiple polymer reactors, each dedicated to one or more stages in a process.

In cases in which more than one reactor is used, the present disclosure provides that at least one of the reactors may be equipped for active control. It is not always necessary that every stage be actively controlled, as in some instances a polymer is brought to a certain condition by active control, such as a mass or composition distribution, after which a stage is used that doesn't require active control, for example, polymerizing off remaining monomer, or monitoring low amounts of residual monomer.

Examples of multimodal polymers may include but are not limited to 1) a composition blend; 2) a molecular weight blend; 3) multimodal polymers produced by controlled radical polymerization; and 4) multimodal stimuli responsive polymer produced by controlled radical polymerization. A composition blend may be a bimodal blend of homopolymer A and homopolymer B produced by first feeding monomer A until the desired MWD, (i.e. C(M), where M is molar mass) is obtained. The MWD is produced by active control. Monomer B is then fed in until the desired C(M) for homopolymer B is obtained using active control. If some copolymer is produced during the production of the second mode, it will constitute a third, copolymeric mode with its own characteristics. The latter is a modified (or multistage) polymer according to above definitions. The blend then becomes one of bimodal homopolymer A and homopolymer B, and a modified polymer, copolymer AB.

Multimodal polymers may also include a molecular weight blend. It is frequently desirable to have two or more molecular weight modes. For example, long chains can give tensile strength to a polymer and blending it with short chains can enhance the processability. In this case each MWD mode is produced sequentially.

For example, a high MW mode could be initially produced by having a high monomer to initiator ratio. The details of the mode, that is, of the MW trajectory, can be controlled by variables such as monomer and/or initiator flow into the reactor and temperature change. In free radical polymerization as a general rule, increasing monomer concentration increases MW, while increasing T and initiator decrease MW. In the latter case, increasing T and initiator also increases the reaction rate, which may or may not be desirable, depending on the desired outcomes of the reaction. The active controller assures that MW follows the desired path. Once the specified amount of concentration of polymer for mode one is reached C1 a second mode can begin. This might involve a substantial drop in Mw to produce a much lower molecular weight mode. While increasing temperature and initiator can drop the molecular weight, the effect is usually not large enough if something approaching an order of magnitude or more in Mw change is desired. In this case, chain transfer agent can be added (CTA), which has the virtue of leaving the kinetics of conversion unchanged, requires no change in temperature, and can achieve a large reduction in Mw. The trajectory of this second mode can then be controlled as desired until the concentration of polymer in this mode is reached, C2. More modes can be added, such as by adding more CTA to cause a further large drop in Mw until the concentration C3 of the third mode is reached.

It is also possible to provide target trajectories for more than one characteristic and provide means to simultaneously control the reaction trajectories to closely match each individual target trajectory. For example, $M_w$ and composition of a given mode can have their own specific target trajectories, each of which is followed by active control during the process. Each subsequent mode can have a new set of target trajectories for $M_w$ and composition.

In other instances, it may be desired to establish separate $M_w$ and IV target trajectories. Normally $M_w$ and IV are deterministically linked according to their architecture; e.g. architectures such as linear polymer, simply branched polymer, comb branching, dendrimer, etc. In order for $M_w$ and IV to follow paths that aren't deterministically linked (this means that establishing a trajectory for $M_w$ would inexorably determine the trajectory for IV, and vice versa), it requires that the architecture be controlled. This can be done by adding reagents, such as branching agents, encapping agents, inhibitors, crosslinkers, etc. It is also possible to impose target trajectories and control of more than two characteristics simultaneously, such as $M_w$, IV, and composition by adding comonomeric feeds to the control variables to the other control variables. In such a case the instantaneous relationship between $M_{w,inst}$ and instantaneous IV, $IV_{inst}$ is used to establish target trajectories of each and for control of process variables. Intrinsic viscosity (IV) is the limit of reduced viscosity (RV) at zero polymer concentration and zero shear rate. Branching, crosslinking and other architectural features control the high shear, non-Newtonian behavior of polymer solutions. Hence, simultaneous measurement of low shear (yielding an RV very close to IV) and high shear measurements can be used as an index of architecture in following a target trajectory.

In the final mode, no matter how many are produced, it can be advantageous, and often necessary to reduce the monomer concentration to a very low residual value, such as 100 parts per million (ppm). There are products, such as acrylamide based polymers for human use that require 10 ppm residual monomer or less, and in some highly exacting applications, such as in electronic and optical coatings, the requirement can be less than 1 ppm. To achieve the low ppm it may be sufficient to merely keep the reaction conditions the same as in the last mode and monitor the depletion of monomer to the set point ppm. Alternatively, adding more initiator and/or increasing temperature allows the reaction to more quickly reach the set point ppm.

It may be desired to modify a polymer in one stage before continuing to synthesis of a subsequent mode, or as a final stage. Modifications can be of many types such as, but not limited to, sulfonation, amination, PEGylation, acid or base hydrolysis, carbonation, hydroxylation, quaternization, and phosphorylation. The modifications can be carried out using active control until the desired stage of modification is reached and synthesis of the next mode begins.

An example is the hydrolysis of polyacrylamide by NaOH to produce a charged polymer, that is, a polyelectrolyte, with the charged moiety COO—. The amount of NaOH, the temperature and the time of hydrolysis determine what fraction of monomers in the chain are modified to COO—. Conductivity, viscosity, and light scattering all show marked changes as the electrical charge of the modified polymer increases, and active control can be used to vary the modification conditions to optimize the target modification properties. When the modification is complete, the subsequent mode can be produced. An example would be to follow on with the synthesis of a neutral polymer, such as polyvinylpyrrolidone or polyacrylamide, thus producing a blend of polyelectrolyte and neutral polymer.

Additional modes that may also be added include multimodal polymers produced by controlled radical polymerization. In controlled radical polymerization the molecular weight is often controlled by the ratio of monomer to CRP agent (e.g., RAFT agent). In this case molecular weight only needs to be monitored, but not actively controlled, unless there is a deviation from the desired molecular weight path. In contrast, the composition can be actively controlled by comonomer feeds. This forms an interesting class of multimodal polymer because each final polymer chain can bear the multimodal signature imbued on the chain by the various process stages. This results in a multi-compositional chain, sometimes referred to as a 'gradient copolymer'. With this invention, however, the gradients need not be accrued by passively providing different concentrations of the two or more comonomers and letting the natural reactivity ratios determine the composition gradient. Rather, according to the present disclosure it is possible to impart specific compositions at will along the polymers by actively controlling comonomer feeds. This will hence not necessarily result in a smooth 'gradient' but can result in sections along the polymer chain of specific composition with steep transition gradients between the various desired composition sequences. In this example, the polymers themselves are multimodal, whereas for free radical polymerization there is a blend of subpopulations of polymers, each population having its own characteristics.

Examples of multimodal polymers may also include multimodal stimuli responsive polymers produced by controlled radical polymerization. In regards to the last example, a class of polymers that can result from CRP and allied methods are stimuli responsive polymers, sometimes termed 'smart materials'. These are characterized by having specific copolymer compositions, often achieved by producing polymers of specific architectures, oftentimes more complex than just linear chains. Such architectures can include cyclic polymers, stars, dendrimers, and cavitands. The current invention actively controls composition and monitors molecular weight so that the desired composition and molecular weight characteristics are achieved within the framework of the desired architecture.

Control variables include, but are not limited to, addition of monomers, comonomers, initiators, quenchers, chain transfer agents, redox reagents, branching agents, cross-linking agents, agents which serve to both branch and cross-link, inert gases such as $N_2$, gases which affect free radical reactions, such as $O_2$, and changes in temperature, stirring, and agitation. Control schemes can be developed for each of these.

According to the present disclosure, a method, not limiting, for active control of $M_w$ during free radical polymerization is provided. The method may include a controller that is based on two basic principles or may involve any detailed kinetic or inferential models with many parameters. The controller with two basic principles was tested using the free radical polymerization of Acrylamide (Am) in conjunction with an ACOMP system (automatic continuous online monitoring of polymerization reactions), and both manual active control and fully automatic active control.

The instantaneous kinetic chain mass $M_v$ is proportional to monomer concentration, $C_m$, and instantaneous weight average molecular weight, Mw,inst, is proportional to the kinetic mass $M_v$:

$$M_{w,inst} = aM_v = pC_m \qquad (3)$$

The proportionality constant p subsumes all the complex parameters that constitute the relationship in equation 3, without the need to explicitly know any of them. In a typical standard free radical kinetic model, for example, p would be given by $$p = d\frac{k_p}{k_t[R] + k_3[CTA]} \qquad (4)$$

where $k_p$ is the propagation constant, $k_t$ is the termination constant, $k_3$ is the chain transfer constant, [R] is the free radical concentration, [CTA] is the concentration of chain transfer agent, and d is a dimensionless constant on the order of unity that depends on what percentage of termination is by disproportionation and what by recombination, as well as the instantaneous relationship between the weight average chain length and most probable (kinetic) chain length.

Each of these parameters can be steep functions of temperature and to further increase the complexity of p, [R] is composed of additional terms. In the free radical polymerization quasi-steady state approximation (QSSA), for example, $$[R] = \sqrt{\frac{2Fk_d[I_2]}{k_t}}, \qquad (5)$$

where F is the initiator efficiency, $k_d$ is the initiator decomposition rate constant, and $[I_2]$ is the initiator concentration. (see Dotson, N. A.; Galvan, R.; Laurence, R. L.; Tirrel, M. *Polymerization Process Modelling*; VCH Pub.: New York, 1996.) These can also have steep temperature dependences, and $[I_2]$ is generally time dependent.

The rate of polymerization of monomer is proportional to the concentration of monomer. That is:

$$\frac{dC_m}{dt} = -\alpha(t)C_m. \qquad (6)$$

The proportionality parameter $\alpha(t)$ may change in the course of time. For free radical polymerization $\alpha(t)$ subsumes several other parameters. For example, in a typical kinetic model $$\alpha(t) = k_p[R] \qquad (7)$$

where [R] can change in time due to changes in parameters, for example, those in equation 5, and $k_p$ can change both due to temperature, chain length, viscosity of the reaction milieu, and other quantities.

The presently disclosed controller is robust because after an Ansatz value of C(t) is used, for example, as determined in a previously monitored batch reaction, α can be re-computed at intervals during a reaction and the new value will subsume changes in all the parameters into this single, experimentally measured parameter. The re-computation of α(t) during the reaction will also correct errors in the Ansatz value. In some instances, no Ansatz value is used and the reaction is allowed to proceed under initial conditions (e.g. of temperature and reagent concentrations) until α(t) (or any other measurable parameter needed for control) is measured for the first time during the reaction.

In this particular controller a single control variable is used, the flow rate of monomer from a concentrated monomer reservoir (51% Am) into the reactor, in other words, semi-batch operation is used.

This flow rate is designated Q(t), and it is the automatic computation of Q(t) and the automatic setting of the reservoir pump to the computed value that provides the $M_w$ control needed to follow the target trajectory $M_{w,t}(t)$. The ACOMP extraction rate from the reactor is q(t), which is usually small, between 0.25 and 0.5 cm³/min, and held constant. It is treated as negligible in the following. This outflow from the reactor provides the continuous sample stream that is diluted and conditioned for the ACOMP measurements. V(t) is the volume of liquid in the reactor and $V_o$ is the initial volume.

The change in monomer concentration $dC_m$ over an interval dt is given by $$dC_m = \left(-\alpha(t)C_m + \frac{C'_m}{V(t)}Q(t)\right)dt \qquad (8)$$

$C_m'$ is the concentration of monomer in the reservoir and V(t) the reactor volume as a function of time.

This controller can be extended to the use of other control variables such as, but not limited to, multiple monomer feed to simultaneously control both composition and molecular weight, feeds of initiator to increase reaction speed and decrease molecular weight, feed of inhibitors such as air or $O_2$ to slow or stop reactions, feed of chain transfer agents to lower molecular weight, feed of surfactants to interact or encapsulate polymers, feed of branching and cross-linking reagents, and changes of temperature.

Equation 8 allows monomer concentration $C_m(t)$ to be the controlled process characteristic, which can frequently be valuable in its own right, and is just one step away from control of $M_w$, once p is introduced. $C_{m,t}(t)$ designates the target trajectory for $C_m(t)$. The object will then be to make $C_m(t)$ in a reaction follow $C_{m,t}(t)$.

This controller now breaks the reaction up into finite control intervals $\Delta t_i$ where $\Delta t_i$ is the duration of the $i^{th}$ control interval, and $\Delta t_i$ is very short compared to the duration of the entire reaction, which allows changes in variables and characteristics to be approximated as linear over the short intervals. At the beginning of control interval i, which starts at $t_i$, the required amount of monomer change over this interval, $\Delta C_{m,t,i}$, is the target trajectory value at $t_i + \Delta t_i$ minus the current measured value $C_m(t_i)$, that is $$\Delta C_{m,t,i} = C_{m,t}(t_i + \Delta t_i) - C_m(t) \quad (9)$$

Expanding dt to $\Delta t_i$ in equation 8, and using equation 9, the needed flow rate $Q(t_i)$ is computed by $$Q(t_i) = \frac{V(t_i)}{C'_m} \left[ \frac{\Delta C_{m,t,i}}{\Delta t_i} + \alpha(t_i) C_m(t_i) \right] \quad (10)$$

The controller then sets the monomer feed pump to $Q(t_i)$ at $t_i$.

In equation 10 $\alpha(t_i)$ is the latest value of $\alpha(t)$. $\alpha(t_i)$ can be computed over any previous time interval $\Delta \tau$ during the reaction as follows. The rate at which polymer is produced is $$\frac{dC_p}{dt} = \alpha C_m \quad (11)$$

so that the polymer concentration at any time, by mass balance, is $$C_p(t) = C_{m,o} - C_m(t) + \frac{C'}{V(t)} \int_0^t Q(t') dt' \quad (12)$$

where $C_{m,o}$ is the initial amount of monomer in the reactor. $C_m(t)$ is measured directly by ACOMP, $\int_0^t Q(t') dt'$ is known by automatic integration of the pump flow rate and V(t) is given by $$V(t) = V_0 - qt + \int_0^t Q(t') dt' \quad (13)$$

where q is the constant ACOMP withdrawal rate. Hence, $\alpha(t_i)$ can be computed over any previous time interval $\Delta T$ before $t_i$ by $$\alpha(t_i) = \frac{\Delta C_p(\Delta \tau)}{C_m(t_i - \Delta \tau) \Delta \tau} \quad (14)$$

The actual value of $\Delta \tau$ used depends on signal/noise considerations and does not have to correspond to the control interval values $\Delta t_i$.

FIG. 1 shows an example of monomer concentration control using the above approach. In this a non-monotonic trajectory for $C_{m,t}(t)$ was chosen to set it strongly apart from a simple exponential decay in a corresponding batch reaction. A sinusoid of the form $$C_{m,t}(t) = 0.010 + 0.002 \sin(\omega t) \text{ (g/cm}^3\text{)} \quad (15)$$

was used, where $\omega = 2.5 \times 10^{-4} \pi$ radians/s. The reaction was carried out at T=55° C.

The controller result is quite excellent and falls well within a 2% error bar from the target trajectory, and is in fact indistinguishable from the target trajectory in the first half of the cycle. Also shown in FIG. 1 is the monomer concentration trajectory in an equivalent pure batch reaction with no monomer feed.

Controlling $M_w$ requires use of the proportionality parameter p(t) introduced in equation 3. First, a target trajectory for $M_{w,inst}$ or $M_w(t)$ was decided upon. For the former, the target trajectory is denoted The $M_{w,inst}(C_p)$ control trajectory is then determined according to equation 3. Since $C_p(t)$ is known, the representation in terms of is used here.

Consider that from a time t to a time $\Delta t$ in the future $M_{w,t}(t+\Delta t)$ can be written as $$M_{w,t}(t + \Delta t) = \frac{\int_0^t M_{w,inst,t} dC_p + \int_t^{t+\Delta t} M_{w,inst,t} dC_p}{C_p + \Delta C_p} \quad (16)$$

where $M_{w,t}(t+\Delta t)$ is the value the experimental $M_{w,e}$ should be at $t+\Delta t$, where $M_{w,e}(t)$ is the experimentally measured value from ACOMP. Expanding to first order;

$$\frac{1}{C_p + \Delta C_p} = \frac{1}{C_p}\left(1 - \frac{\Delta C_p}{C_p} + \ldots\right) \cong \frac{1}{C_p}\left(1 - \frac{\Delta C_p}{C_p}\right) \quad (17)$$

allows equation 16 to be written as $$M_{w,t}(t + \Delta t) = \frac{\left(\int_0^t M_{w,inst,t} dC_p + \int_t^{t+\Delta t} M_{w,inst,t} dC_p\right)}{C_p}\left(1 - \frac{\Delta C_p}{C_p}\right) \quad (18)$$

This will apply after some $C_p$ has been accumulated, to justify the series truncation; i.e. when $C_p \gg \Delta C_p$. It is also necessary to accumulate a finite $C_p$ in order to get an accurate measurement of $M_{w,e}(t)$ from the ACOMP light scattering detector.

Now, the first integral is what the target $M_{w,t}(C_p)$ should be at t, whereas it is desired that the target $M_{w,t}(t+\Delta t)$ be reached at $t+\Delta t$. Hence, the trajectory has to be corrected over t to $t+\Delta t$ to achieve this, and the interval starts at the real, experimentally measured $M_{w,e}(t)$. Hence, the first integral from 0 to $C_p$ is replaced by $M_{w,e}(t)$. Further, calling $<M_{w,inst,t}>$ the average $M_{w,inst}$ over the concentration interval $C_p(t)$ to $C_p(t+\Delta t)$ allows the theorem of the mean to be invoked for the second integral in equation 18, so that $$M_{w,t}(t + \Delta t) = \left(M_{w,e}(t) + \frac{<M_{w,inst,t}> \Delta C_p}{C_p}\right)\left(1 - \frac{\Delta C_p}{C_p}\right) \quad (19)$$

where $\Delta C_p = C_p(t+\Delta t) - C_p(t)$, and, according to the above replacement of the $M_{w,t}(t)$ by the experimental $M_{w,e}(t)$, determined by the experimental instantaneous weigh average $M_{w,inst,e}$.

$$M_{w,e}(t) = \frac{\int_0^t M_{w,inst,e} dC_p}{C_p} \quad (20)$$

Retaining terms to only first order in $\Delta C_p/C_p$ gives $$M_{w,t}(t+\Delta t) = M_{w,e}(t)\left(1 - \frac{\Delta C_p}{C_p}\right) + \frac{<M_{w,inst,t}>\Delta C_p}{C_p} \quad (21)$$

Now, $\Delta M_{w,t}(t)$ is defined to be the increment in $M_w$ that must occur over time $\Delta t$ in order for $M_{w,e}(t+\Delta t)$ to be equal to $M_{w,t}(t+\Delta t)$.

$$\Delta M_{w,t}(t) = M_{w,t}(t+\Delta t) - M_{w,e}(t) \quad (22)$$

This allows equation 21 to be re-written as $$\Delta M_{w,t}(t) = (<M_{w,inst,t}> - M_{w,e}(t))\frac{\Delta C_p}{C_p} \quad (23)$$

using the relationship between $<M_{w,inst,t}>$ and the average monomer concentration $<C_m>$ over the interval $t$ to $t+\Delta t$.

$$<M_{w,inst,t}> = p(t)<C_m> \quad (24)$$

and $$\Delta C_p = \alpha(t)<C_m>\Delta t \quad (25)$$

leads to $$\Delta M_{w,t}(t) = (<C_m>p(t) - M_{w,e}(t))\frac{\alpha(t)<C_m>\Delta t}{C_p} \quad (26)$$

yielding the quadratic equation $$<C_m>^2 - \frac{M_{w,e}(t)}{p(t)}<C_m> - \frac{\Delta M_{w,t}(t)C_p}{p(t)\alpha(t)\Delta t} = 0 \quad (27)$$

This yields the solutions $$<C_m> = \frac{M_{w,e}(t)}{2p(t)} \pm 0.5\left(\left(\frac{M_{w,e}(t)}{p(t)}\right)^2 + \frac{4C_p \Delta M_{w,t}(t)}{\alpha(t)p(t)\Delta t}\right)^{1/2} \quad (28)$$

This controller assumes that control intervals are short enough that the quantities change linearly over the control intervals $\Delta t$, which are much shorter than the duration of the reaction. Hence $$<C_m> = \frac{C_m(t+\Delta t) + C_m(t)}{2} \quad (29)$$

so that $$C_m(t+\Delta t) = 2<C_m> - C_m(t) \quad (30)$$

and the required change in $C_m$ over the control interval $\Delta t$ is $$\Delta C_m(t) = 2[<C_m> - C_m(t)] \quad (31)$$

using $$\Delta C_m(t) = \left(-\alpha(t)C_m(t) + \frac{C'}{V(t)}Q(t)\right)\Delta t \quad (32)$$

gives the flow rate $Q(t)$ to which the monomer feed pump should be set over the entire control interval $\Delta t$ $$Q(t) = \frac{V(t)}{C'}\left(\frac{\Delta C_m(t)}{\Delta t} + \alpha(t)C_m(t)\right) \quad (33)$$

or $$Q(t) = \frac{V(t)}{C'}\left(\frac{2[<C_m> - C_m(t)]}{\Delta t} + \alpha(t)C_m(t)\right) \quad (34)$$

where $<Cm>$ is from equation 28.

The value of p can be re-computed over any interval $\Delta T$ before t by $$p(t) = \frac{1}{C_m(t)}\left(M_{w,e}(t) + \frac{C_p(t)\Delta M_{w,exp}(t)}{\alpha(t)C_m(t)\Delta\tau}\right) \quad (35)$$

where $\Delta M_{w,exp}(t)$ is the difference between $M_{w,e}(t)$ and $M_{w,e}(t-\Delta T)$ $$\Delta M_{w,exp}(t) = M_{w,e}(t) - M_{w,e}(t-\Delta\tau) \quad (36)$$

Figure 2:
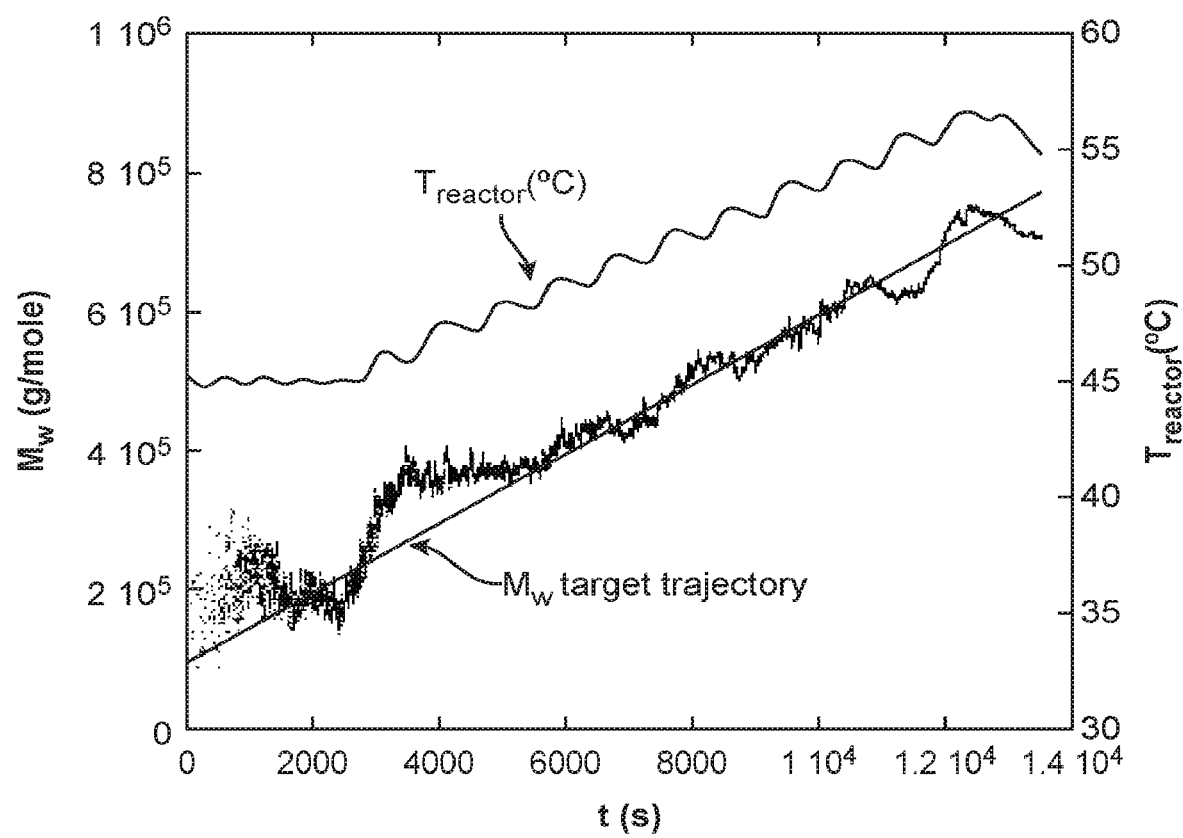
FIG. 2 illustrates automatic $M_w$ controller results when the reactor temperature is changing, including a target trajectory for $M_{w,t}(t)$ increasing linearly in time with a slope 50.0 g/mole-s, according to an example embodiment of the present disclosure.

FIG. 2 shows a target trajectory for $M_{w,t}(t)$ increasing linearly in time with a slope 50.0 g/mole-s. To test the robustness of the controller the temperature was increased by steps from 45° C. to 57° C. during the reaction. The re-computation of p and a gave the controller good performance, seen by the dense black dots saddling the straight line $M_{w,t}(t)$. Automatically computed values of a ranged from $1.0 \times 10^{-4}$ $s^{-1}$ to $2.5 \times 10^{-4}$ $s^{-1}$, while p ranged from $4.0 \times 10^7$ to $9.0 \times 10^7$. These data demonstrate how the controller continues to function even when reactor temperature changes significantly during the reaction, without requiring a detailed kinetic model.

According to at least one aspect of the present disclosure, a method for active composition and molecular weight control during free radical polymerization is provided. The method includes a controller that extends the approach of the molecular weight homopolymerization controller above to the control of composition of comonomers A and B during free radical copolymerization using the ACOMP platform. It hence allows for simultaneous control of molecular weight and copolymer composition. It is thus possible to specify any $M_w$ properties and composition properties of each mode. For example, not limiting, a first mode may have constant $M_w$ and a constant composition, a second mode may have a different constant $M_w$ and different constant composition, a third mode may have yet another constant $M_w$ and composition, and so on. As another example, not limiting, it is possible to increase, decrease or hold constant $M_w$ in any mode while increasing, decreasing or holding constant composition of that mode, and so on for two or more successive modes. The model model-independent approach illustrated above, not limiting, does not require a kinetic model, nor kinetic model parameters, such as reactivity ratios. It is possible to also use controllers incorporating kinetic models at any level of complexity as deemed best for a given application in producing multimodal polymers.

Of special note is that the control of composition will apply equally well to living type reactions, such as controlled radical polymerization (RADT, ATRP, NMP, ROMP, etc.). The difference between producing a composition distribution by the following method for free radical copolymerization and living type copolymerization is as follows: In free radical polymerization polymer chains initiate, propagate and terminate very quickly compared to the total length of the reaction (e.g. milliseconds for producing an individual polymer in a reaction lasting tens of minutes). Hence, the controller will produce a distribution of chains with varying compositions. In the living case, each growing polymer continues to grow, ideally, until all monomer is exhausted or the reaction is otherwise terminated. Hence, the composition trajectory is born along the length of each chain, that is, a gradient of composition exists along individual chains. Being able to control the latter can produce materials of profoundly different properties, since the way two or more comonomer interact along a chain can lead to many different types of conformations, phases, and morphological structures.

In the homopolymer case above, a single rate constant α and a molecular weight proportionality constant, p, were needed, each of which can be re-computed during the reaction. To extend to a copolymer system the rates $\alpha_A$ and $\alpha_B$ are introduced, such that, over an interval $\Delta t$ the amount of A and B converted to polymer are $$\Delta A_p = \alpha_A A \Delta t$$

$$\Delta B_p = \alpha_B B \Delta t \tag{37 a,b}$$

where A and B represent the concentration of monomers A and B. Although $\alpha_A$ and $\alpha_B$ can change throughout the reaction, and hence should be re-computed during the reaction, cases have been found where $\alpha_A$ and $\alpha_B$ remain constant. (see A. M. Alb, P. Enohnyaket, R. Shunmugam, G. N. Tew, W. F. Reed, "Quantitative contrasts in the copolymerization of acrylate and methacrylate monomers", Macromolecules, 39, 8283-8292, 2006.)

The issue of the relationship between monomer concentration and instantaneous molecular weight $M_{w,inst}$ can be more complex. In the homopolymer case the proportionality constant subsumed all underlying rates and parameters into a single, re-computable constant p $$M_{w,inst} = pm \tag{38}$$

where m is the monomer concentration.

For the copolymer case the total monomer concentration m is given by $$m = A + B \tag{39}$$

Equation 38 holds over any relatively short interval, but the dependencies of p now extend also to implicitly include any underlying relative reactivities and the ratio A/B. Because the values of A and B are determined only up to their ratio A/B at any time for a given target trajectory, the sum in equation 44 can have an arbitrary value of m. Using equation 38 and the value of p at any time during the reaction $M_{w,inst}$ can be specified, which fixes the value of m at that time, completing the set of three variables A, B, and m, and hence a target trajectory $M_{w,inst,t}$ can be defined simultaneously with the target composition trajectory.

Since p(A,B) can be measured throughout a reaction, simultaneous control of composition and molecular weight is possible. It is noted that computation of $M_w$ by light scattering for copolymers becomes significantly more complex if the comonomers in the copolymer have significantly different dn/dc in the solvent used when there is significant breadth to the composition distribution. This problem has been solved using ACOMP, but requires specific implementation. (see P. Enohnyaket, T. Kreft, A. M. Alb, M. Drenski, W. F. Reed, "Determination of molecular mass during online monitoring of copolymerization reactions", Macromolecules, 40, 8040-8049, 2007.)

The presently disclosed controller depends on separate semi-batch feeds of comonomer to the reactor. There are two reservoirs, one for monomer A at concentration $C_A'$ and one for B at concentration $C_B'$. The flow rates from reservoir A and B may be controlled independently and at any time t will feed the reactor at rates $Q_A(t)$ and $Q_B(t)$, respectively. The object of the controller is to automatically compute and adjust the needed flow rates $Q_A(t)$ and $Q_B(t)$ throughout the reaction. Hence, the solutions to $Q_A(t)$ and $Q_B(t)$ are sought in the following development.

According to at least one aspect of the present disclosure, the cumulative and instantaneous fractional compositions may be required for the controller. The primary quantity that the ACOMP system measures in terms of conversion is the concentration of each monomer A and B. The amount of each monomer in polymeric form $A_p$ and $B_p$ at any point in the reaction is found from mass balance by $$A_p(t) = A_o - A(t)$$

$$B_p(t) = B_o - B(t) \tag{40a,b}$$

The cumulative fraction of polymer consisting of A is $f_A$, and of B is $f_B$.

$$f_A(t) = \frac{A_p}{A_p + B_p} = \frac{A_p}{C_p}$$

$$f_B(t) = \frac{B_p}{A_p + B_p} = \frac{B_p}{C_p} \tag{41a, b}$$

where $f_A(t) + f_B(t) = 1$ and the total concentration of polymer is $$C_p = A_p + B_p \tag{42}$$

The instantaneous most probable fraction of A in polymer chains produced at any time t is $$F_{A,inst} \equiv F_A = \frac{dA_p}{dA_p + dB_p} \tag{43}$$

Since $dA_p = -dA = \alpha_A A dt$, $F_A$ can be written as $$F_A = \frac{\alpha_A A}{\alpha_A + \alpha_B B} \tag{44}$$

Equation 44 shows the power of $\alpha_A$ and $\alpha_B$, since they not only determine the consumption of each comonomer, but also the instantaneous most probable composition $F_A$. Since $F_B = 1 - F_A$ it suffices to concentrate on determination and control of $F_A$, and $F_B$ follows automatically. Hence, controllers of composition can be based directly on values of $\alpha_A$ and $\alpha_B$ measured during a reaction. There is, of course, a distribution of compositions around the most probable value. Here, the most probable instantaneous value of $F_A$ will be referred to as the 'average value of composition'. Model distributions were previously used in ACOMP to produce full composition distributions from the most probable values. Hence, full distributions of composition can be made in realtime online, based on measured values of $F_A$ and any appropriate composition distribution model. (see A. Giz, A. Oncul Koc, H. Giz, A. M. Alb, W. F. Reed "Online monitoring of reactivity ratios, composition, sequence length, and molecular weight distributions during free radical copolymerization", Macromolecules, 35, 6557-6571, 2002.)

In at least some instances, the controller follows a target composition trajectory $f_{A,t}(t)$ and a target total monomer trajectory $m_t(t)$. In conjunction with equation 38 and measured values of p, a target $M_w$ trajectory can be simultaneously followed with the target composition trajectory. The controller will produce a final composition distribution $C(F_A)$ where $C(F_A)dF_A$ is the concentration of chains that have a fractional composition of monomer A, $F_A$, within the interval $F_A$ to $F_A$–$dF_A$. In terms of the average instantaneous values $F_A$.

$$f_A(t) = \frac{\int_0^t F_A dA}{\int_0^t F_A dA + \int_0^t F_B dB} = \frac{\int_0^t F_A dA}{C_p} \quad (45)$$

From this, $F_A(t)$ can also be computed, aside from equation 44, directly from the ACOMP measured value of $f_A(t)$, $A_p$, and $C_p$ by $$F_A = \frac{d(C_p f_A)}{dA} \quad (46)$$

Operationally, $C(F_A)$ is established offline, e.g. by an optimization program such as gPROMS, and the desired path $f_{A,t}(t)$ is established. This can also be expressed as $f_A(A)$ or $f_A(C_p)$, since t, A, and $C_p$ are all known simultaneously with ACOMP.

With the composition trajectory $f_A(t)$ defined it is then necessary to specify the trajectory of the total monomer concentration $m_t(t)$. The basis for this will be both in order to determine the rate and amount of copolymer production and, if p(A/B) is known or approximated, a desired or theoretical molecular weight trajectory can be established $M_{w,t}(t)$. With this latter, it is hence possible to simultaneously control both composition and molecular weight trajectories (this latter via equation 38). Furthermore, the values of $\alpha_A$ and $\alpha_B$, which can be remeasured as frequently as needed during a reaction can be used to directly determine $F_A$ in equation 44, and thus allow a desired target composition trajectory to be followed.

In a further elaboration, a control interval is established, $\Delta t$ and the value of the trajectory at $t+\Delta t$ is $$f_A(t + \Delta t) = \frac{\int_0^t F_A dA + \int_t^{t+\Delta t} F_A dA}{C_p + \Delta C_p} \quad (47)$$

Expanding this to first order in $\Delta C_p$ gives $$f_A(t + \Delta t) = \left[\frac{\int_0^t F_A dA + \int_t^{t+\Delta t} F_A dA}{C_p}\right]\left(1 - \frac{\Delta C_p}{C_p}\right) \quad (48)$$

Using the theorem of the mean the second integral can be expressed in terms of the average value of $F_A$ over t to $t+\Delta t$ as $<F_A>$ according to $$\int_t^{t+\Delta t} F_A dA = <F_A>\Delta t \quad (49)$$

So that, to first order in $\Delta C_p$ $$f_A(t + \Delta t) = f_A(t)\left(1 - \frac{\Delta C_p}{C_p}\right) + <F_A>\frac{\Delta A_p}{C_p} \quad (50)$$

The control increment $\Delta f_A(t)$ is the difference between the desired value of $f_A$ at $t+\Delta t$ and the actual measured value at t, $f_A(t)$, that is $$\Delta f_A(t) = f_{A,t}(t+\Delta t) - f_A(t) \quad (51)$$

So $$\Delta f_A(t) = \frac{-f_A(t)\Delta C_p + <F_A>\Delta A_p}{C_p} \quad (52)$$

and, using equations 37a,b $$<F_A> = \frac{1}{\alpha_A A}\left[\frac{C_p \Delta f_A(t)}{\Delta t} - f_A(t)(\alpha_A A + \alpha_B B)\right] \quad (53)$$

Thus, the key control parameter $<F_A>$ is known from a combination of directly measurable quantities and the required control increment $\Delta f_A(t)$.

Now, the control interval $\Delta t$ is taken to be short enough that changes in quantities are linear over the interval. Hence $$<F_A> = \frac{F_A(t) + F_A(t+\Delta t)}{2} \quad (54)$$

This yields the condition for finding what $F_A(t+\Delta t)$ needs to be in order to follow the target trajectory $$F_A(t+\Delta t) = 2<F_A> - F_A(t) \quad (55)$$

where $F_A(t)$ is known at t according to equation 49. $F_A(t+\Delta t)$ can then be written as $$F_A(t + \Delta t) = \frac{\alpha_A(A + \Delta A)}{\alpha_A(A + \Delta A) + \alpha_B(B + \Delta B)} \quad (56)$$

The total monomer trajectory can be used to express $\Delta B$ as $$\Delta B = \Delta m - \Delta A \quad (57)$$

Where $\Delta m$ is the difference in total monomer concentration from t to $t+\Delta t$, in order to follow the desired total monomer trajectory $m_t(t)$.

$$\Delta m(t) = m_t(t+\Delta t) - m(t) \quad (58)$$

Substituting this into equation 57, solving for $\Delta A$, and simplifying yields $$\Delta A = \frac{\alpha_A A[1 - F_A(t+\Delta t)] - \alpha_B(B + \Delta m)}{\alpha_A[F_A(t+\Delta t) - 1] - \alpha_B F_A(t+\Delta t))} \quad (59a)$$

A similar procedure gives ΔB $$\Delta B = \frac{\alpha_B B[1 - F_B(t+\Delta t)] - \alpha_A(A + \Delta m)}{\alpha_B[F_B(t+\Delta t) - 1] - \alpha_A F_B(t+\Delta t))} \quad (59b)$$

Now, the total change ΔA over Δt is due to the loss of A due to polymerization over Δt and the amount of A pumped in over Δt $$\Delta A = \left(-\alpha_A A + \frac{C'_A}{V(t)} Q_A(t)\right) \Delta t \quad (60)$$

which yields the sought after automatically set pump rate $Q_A(t)$ $$Q_A(t) = \frac{V(t)}{C'_A}(\Delta A + \alpha_A A) \quad (61a)$$

Similarly, the pump rate $Q_B(t)$ from monomer B reservoir is $$Q_B(t) = \frac{V(t)}{C'_B}(\Delta B + \alpha_B B) \quad (61b)$$

V(t) is the volume of the reactor at time t, and is computed taken into account both the inflow of fluid from reservoirs A and B, and the outflow from the ACOMP withdrawal rate q.

$$V(t) = V_o - qt + \int_0^t Q_A(t')dt' + \int_0^t Q_B(t')dt' \quad (62)$$

where $V_0$ is the initial volume of the reactor.

The desired target trajectories for composition, $f_{A,t}(t)$, and for total monomer concentration $m_t(t)$ are established offline and are to be implemented. Alternatively, to achieve simultaneous composition and $M_{w,inst,t}$ control, the target trajectories for composition and $M_{w,inst}$ are determined offline, and m(t) is adjusted during the reaction, via equation 38, to follow $M_{w,inst,t}$. At the beginning of the control interval, t, the following characteristics are measured and transmitted to the controller, A(t), B(t), $M_w$(t). The controller uses its latest values of $\alpha_A$ and $\alpha_B$ to compute the amount of A and B, as described above.

This treatment can be extended to copolymers that have three of more comonomers. For example, a terpolymer contains three comonomers, A, B, and C, and the cumulative fractional compositions of each $f_A$, $f_B$, and $f_C$ are found by continuous measurements of the concentrations A(t), B(t), and C(t). The latter time dependent concentrations also yield the corresponding rate constants over any time interval $\alpha_A(t)$, $\alpha_B(t)$, and $\alpha_C(t)$. The instantaneous fractions of each, $F_A(t)$, $F_B(t)$, and $F_C(t)$ are computed similarly to equation 49 at any time t by $$F_A(t) = \frac{\alpha_A(t)A(t)}{\alpha_A(t)A(t) + \alpha_B(t)B(t) + \alpha_C(t)C(t)} \quad (63)$$

And likewise for $F_B(t)$, and $F_C(t)$, where the normalization condition applies that $F_A(t) = 1 - F_B(t) - F_C(t)$. In such cases simultaneous control of $M_{w,inst}(t)$ can also be made by equation 49 since p can be measured and m(t)=A(t)+B(t)+C(t). The procedure can be extended to any number N of comonomers, along with $M_{w,inst}$ control.

It is noted that the approach outlined above for composition control can be streamlined by using a target composition trajectory $F_{A,t}$ and the measured values of $F_{A,t}$ which are directly computed from the measured values of $\alpha_A$ and $\alpha_B$, according to equation 44.

EXAMPLE 1

Multimodal Polymer: Bimodal MWD for Polyacrylamide

Figure 3:
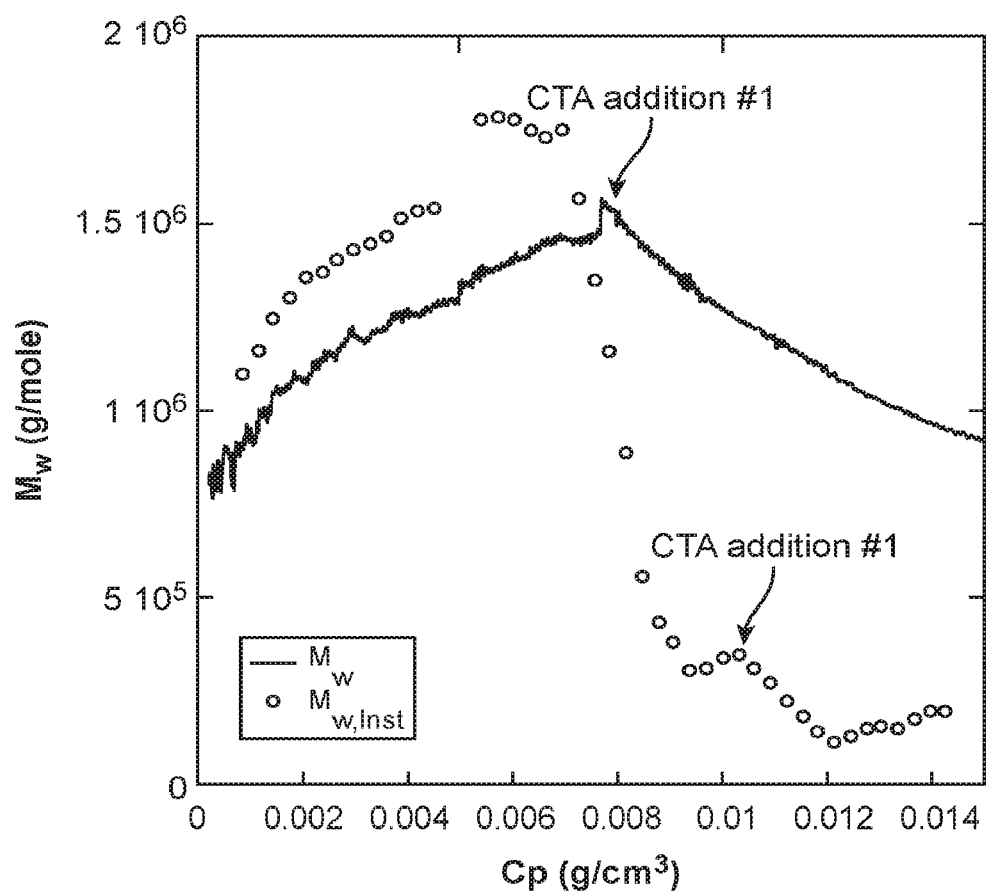
FIG. 3 illustrates $M_w(C_p)$ and $M_{w,inst}(C_p)$ for a reaction using the presently disclosed $M_w$ controller in conjunction with additions of CTA to lower $M_w$ and produce a multimode population, according to an example embodiment of the present disclosure.

An example of an actively controlled production of a trimodal polymer involved free radical polymerization of Am using the $M_w$ controller described above, together with automatic addition of a chain transfer agent (CTA), sodium formate, to cause production of a low molecular weight population in the second stage of the reaction, and a yet lower molecular weight in the third stage. FIG. 3 shows the results for $M_w(C_p)$ and $M_{w,inst}(C_p)$, together with the points at which two additions of CTA, were made. There is a rapid drop in $M_{w,inst}$ after each CTA addition.

Figure 4:
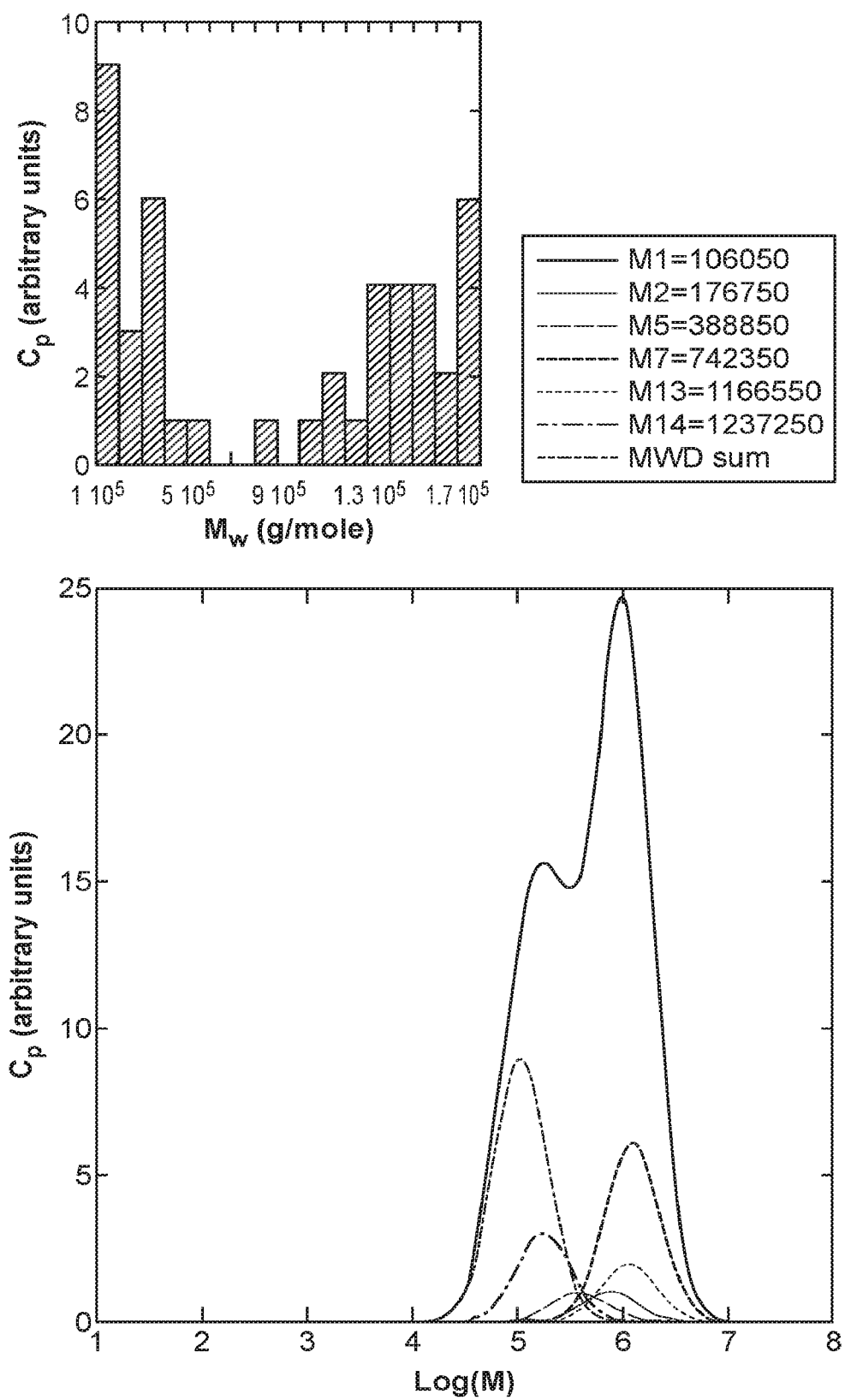
FIG. 4 illustrates a computation of the MWD from the data in FIG. 3, in which the bimodality is seen in the sum of all 14 instantaneous MWD weighted by the amplitudes in the inset histogram and using the inset histogram masses for the log normal instantaneous MWD computation, and showing 14 instantaneous log normal MWD, according to an example embodiment of the present disclosure.

The inset in FIG. 4 shows a histogram of the $M_{w,inst}$ values from FIG. 3 and the main graph of FIG. 4 shows the MWD computed from this histogram using a log normal distribution of the form.

$$C'_p(\ln x) = \frac{\partial C_p}{\partial \ln M} = \frac{\exp[-[\ln(M/M_0)]^2/2\sigma^2]}{\sigma\sqrt{2\pi}} \quad (64)$$

It is completely characterized by the most probable (peak) molecular weight $M_o$ and the width of the MWD, σ. The $M_n$, $M_w$, and $M_z$ values are related to these two parameters by $$M_n = M_o e^{-\sigma^2/2} \quad (65)$$
$$M_w = M_o e^{\sigma^2/2}$$
$$M_z = M_o e^{1.5\sigma^2}$$

For the expected instantaneous MWD width of $M_w/M_n=2$, $\sigma^2=\ln(2)=0.6931$, which allows the instantaneous $M_o$ to be related to $M_{w,inst}$ by $$M_0 = 0.7071 M_{w,inst} \quad (66)$$

Some of the 14 instantaneous MWD are shown together with the sum of all 14 instantaneous MWD in FIG. 4. The net result is bimodal (the effects in $M_w$ reduction due to the two additions of CTA see in FIG. 3 get smeared together in a single low mass mode in FIG. 4).

Figure 5:
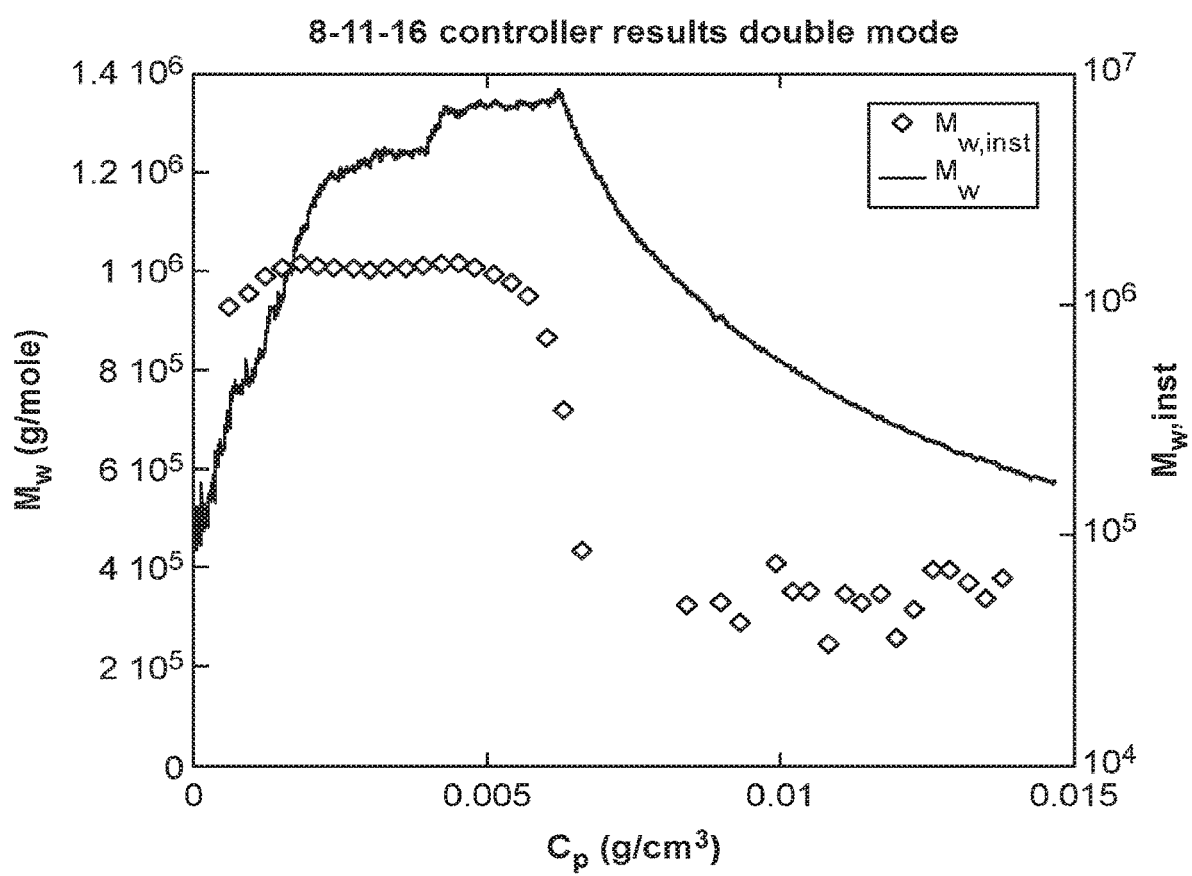
FIG. 5 illustrates synthesis of a bimodal population using the presently disclosed automatic $M_w$ controller, using sodium formate as CTA to produce the large drop in $M_{w,inst}$ to create the second, low molecular weight mode, according to an example embodiment of the present disclosure.

Another example similar to the above is shown in FIG. 5, where only one addition of CTA was made and the bimodality was measured with gel permeation chromatography (GPC). The cumulative $M_w$ increases for the first 40% of the reaction, at which point the CTA is added, after which $M_w$ drops off smoothly. $M_{w,inst}$, in contrast, has a roughly constant value near $10^6$ g/mole for the first 40% and then drops abruptly to around $0.04 \times 10^6$ after the CTA addition, after which it remains constant. In the first 40% the automatic controller sought to keep $M_{w,inst}$ constant at this value, then automatically injected the CTA at the 40% point, and then kept $M_{w,inst}$ constant for the remaining 60% of the reaction.

Figure 6:
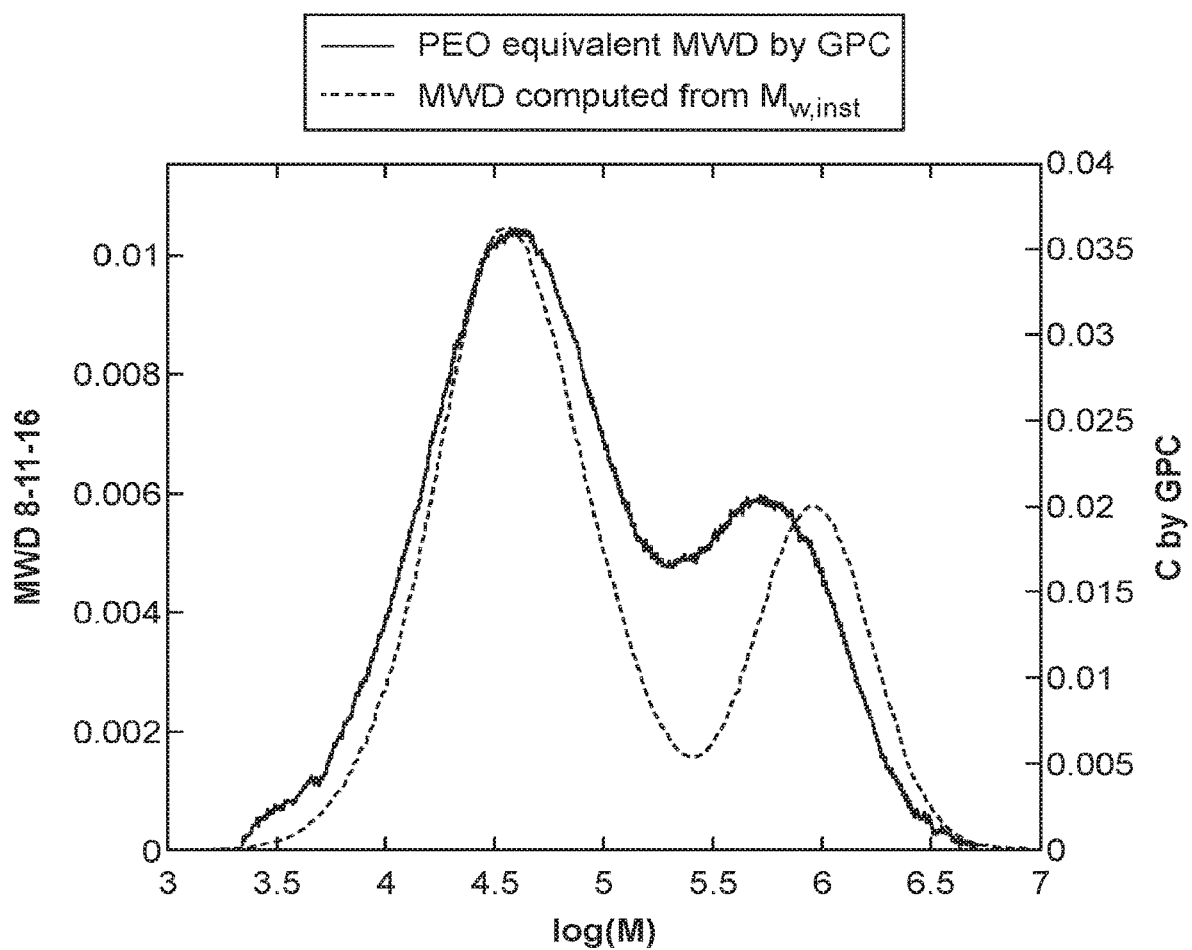
FIG. 6 illustrates a MWD computed using $M_{w,inst}$ for the bimodal polymer end product from FIG. 5 and a lognormal distribution (dashed line), and the PEO-equivalent MWD by GPC where the column was calibrated with PEO molecular weight standards, according to an example embodiment of the present disclosure.

FIG. 6 shows the computation of the MWD, using the lognormal distribution described above in conjunction with the $M_{w,inst}$ of FIG. 5, again using $M_w/M_n=2$. Also shown in FIG. 6 is the PEO equivalent MWD as determined by GPC. For this a Shimadzu chromatography refractive index detector was used to measure the concentration of polymer eluting from the Polymer Standard Services (Amherst, MA) linear XL column, and a Shimadzu High Pressure Liquid Chromatography pump was used to drive the GPC flow. Poly(ethylene oxide), PEO, molecular weight standards, provided by Polymer Standard Services were used to calibrate the column.

The agreement between the computed MWD and the MWD measured by GPC is good, and the following points must be considered: (1) PEO standards only measure a 'PEO-equivalent' mass for the pAm, not an absolute molecular weight. In contrast, the molecular weights used to determine $M_w$ and $M_{w,inst}$ in ACOMP are from light scattering, which is an absolute method not reliant upon calibration by standards; (2) GPC separation isn't exactly log normal and each mode is a bit broader than the computed modes; (3) The resolution of the GPC is not perfect, and is highly dependent on the details of the column, the injection concentration, etc. A column with higher molecular weight resolution would likely show a deeper trough between the high and low molecular weight modes, such as seen in the MWD computation in FIG. 6; (4) Obtaining $M_{w,inst}$ from ACOMP is not yet a precise science, so there is necessarily some error in the computed MWD; (5) A lognormal distribution with Mw/Mn=2 underlies the computation of MWD.

Figure 7:
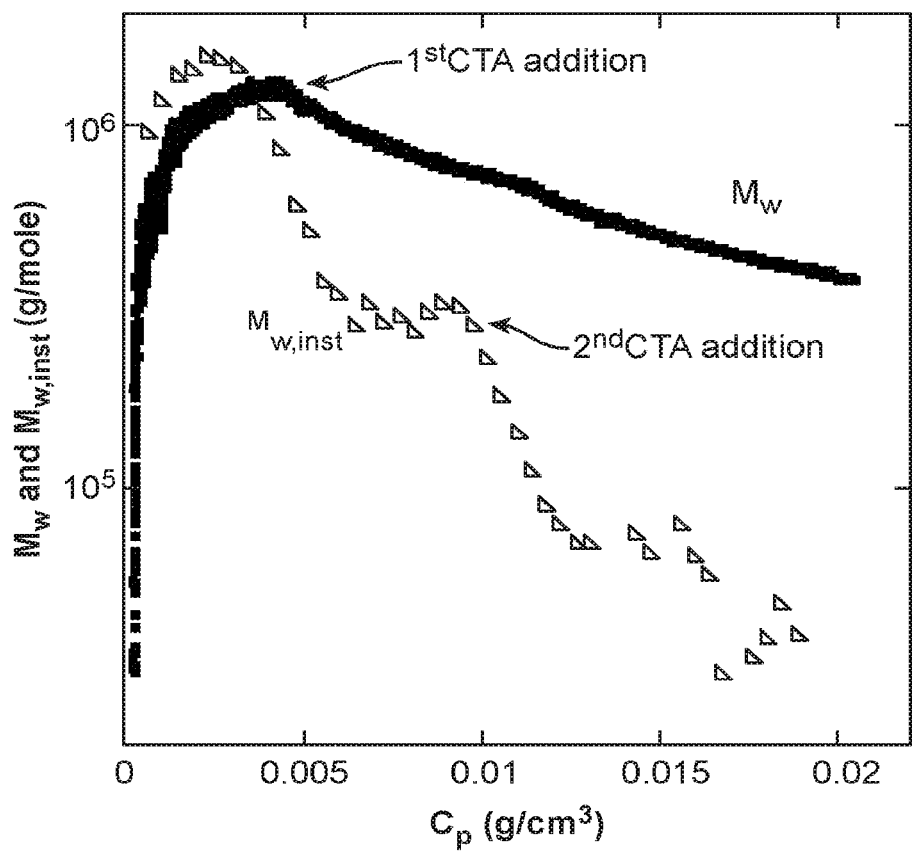
FIG. 7 illustrates the synthesis of a trimodal population using the presently disclosed automatic $M_w$ controller, using automatic additions of sodium formate as CTA to produce the two large drops in $M_{w,inst}$, according to an example embodiment of the present disclosure.

FIG. 7 shows another example where a trimodal molecular weight polymer was synthesized to automatically produce an approximately equivalent concentration of each of the three MWD modes in the final product. In FIG. 7 the $M_w$ of each of the three modes was controlled by addition of Am to the reactor from a reservoir and two automatic additions of CTA were added in order to lower $M_{w,inst}$ in the succeeding two MWD modes, such that approximately ⅓ of the mass of the final product was produced for each $M_w$ mode. While $M_w$, the cumulative weight average molecular weight in the reactor merely shows measurable discontinuities each time CTA is automatically added, the values of $M_{w,inst}$ undergo rapid, large decreases. In the first mode $M_{w,inst}$ is around $1.5 \times 10^6$ g/mole, falling to $2 \times 10^5$ g/mole in the second mode, and to $4 \times 10^4$ g/mole in the third mode. Thus, the end product contains polymer MWD modes separate by up to a factor of 75× in their peak molecular weight.

Figure 8:
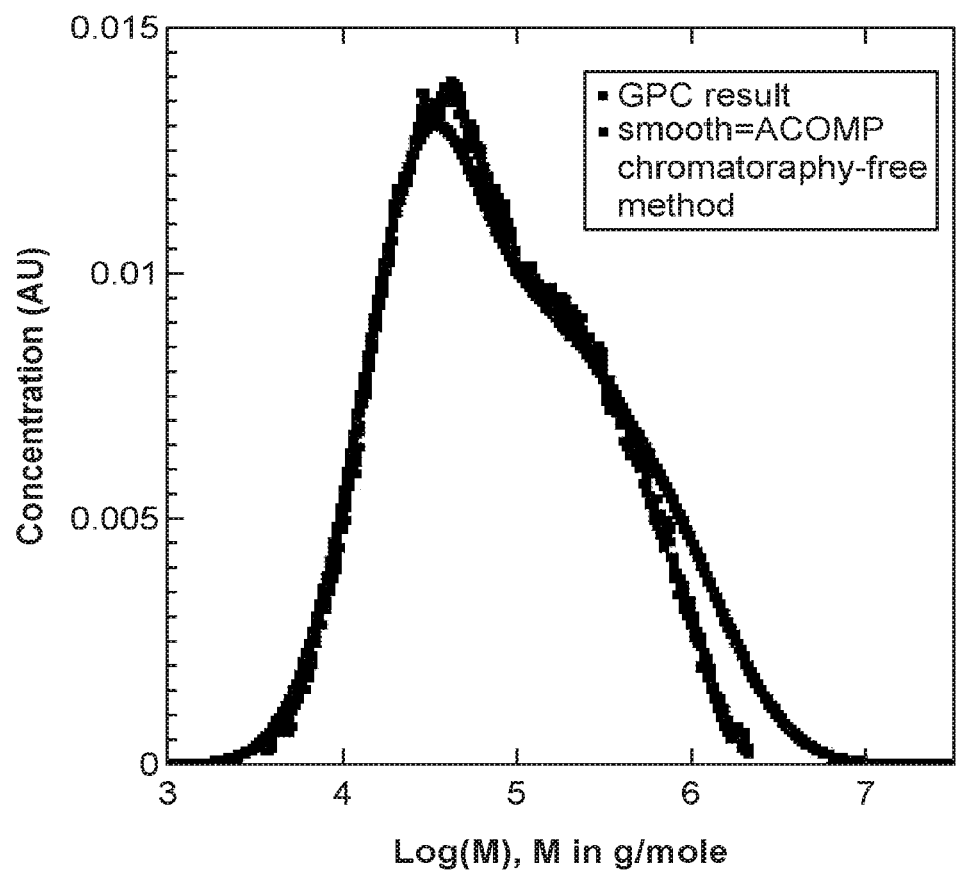
FIG. 8 illustrates a MWD of the endproduct of the trimodal polymer from FIG. 7, determined by GPC and by model based, chromatography-free calculations based on $M_{w,inst}$ (the smooth curve), according to an example embodiment of the present disclosure.

FIG. 8 shows a GPC based MWD of the end product of the trimodal polymer produced in FIG. 7, along with the computed MWD using a log-normal distribution, with $M_w/M_n=2$, and the spectrum of values of $M_{w,inst}$ in the end product (the smoother of the two curves). The MWD produced by each method are in good agreement, however neither method can resolve all three MWD. This is due to the fact that the distributions are quite broad and overlap each other, preventing resolution of all three modes, even though the peaks of the modes are well separated. (A similar situation occurs, for example, in diffraction, where two separate, overlapping light intensity distributions cannot be resolved from each other until a specific, minimum angular separation between their sources is met, the so-called 'Rayleigh Criterion'). The fact that the online ACOMP method of MWD determination shows all three MWD modes (FIG. 7) without recourse to physical separation, such as GPC, demonstrates the power of the ACOMP method, and its ability to resolve multimodal populations produced by the method of the current disclosure.

EXAMPLE 2

A Device to Produce Multimodal Populations

A device capable of producing modified (or multistage) polymers and multimodal polymers was built by Advanced Polymer Monitoring Technologies, Inc. (New Orleans, Louisiana). The device comprised an ACOMP system and Control Interface. The operator interacts with the ACOMP/CI system through a custom designed Human-Machine Interface (HMI), built using the Rockwell Factory Talk View SE environment over the Logix5000 programming software. This was interfaced with all ACOMP hardware through a Rockwell Control Logix PLC. All sensor and detector signals were compiled into the Rockwell database tables locally, which were then sent to the ACOMP Analysis package over an Open Platform Communications gateway (OPC). The ACOMP Analysis software was programmed in C++, which interprets all appropriate sensor and detector signals for characterization of the reaction and polymer properties. The ACOMP Controller software, which receives the online analyses data and sends control signals to regulate different process variables, was developed in Python 3.5 which also communicates with the Rockwell automation through the OPC gateway. In the current application, the controller regulated the flow rate of Am from the concentrated reservoir into the reactor.

Figure 9:
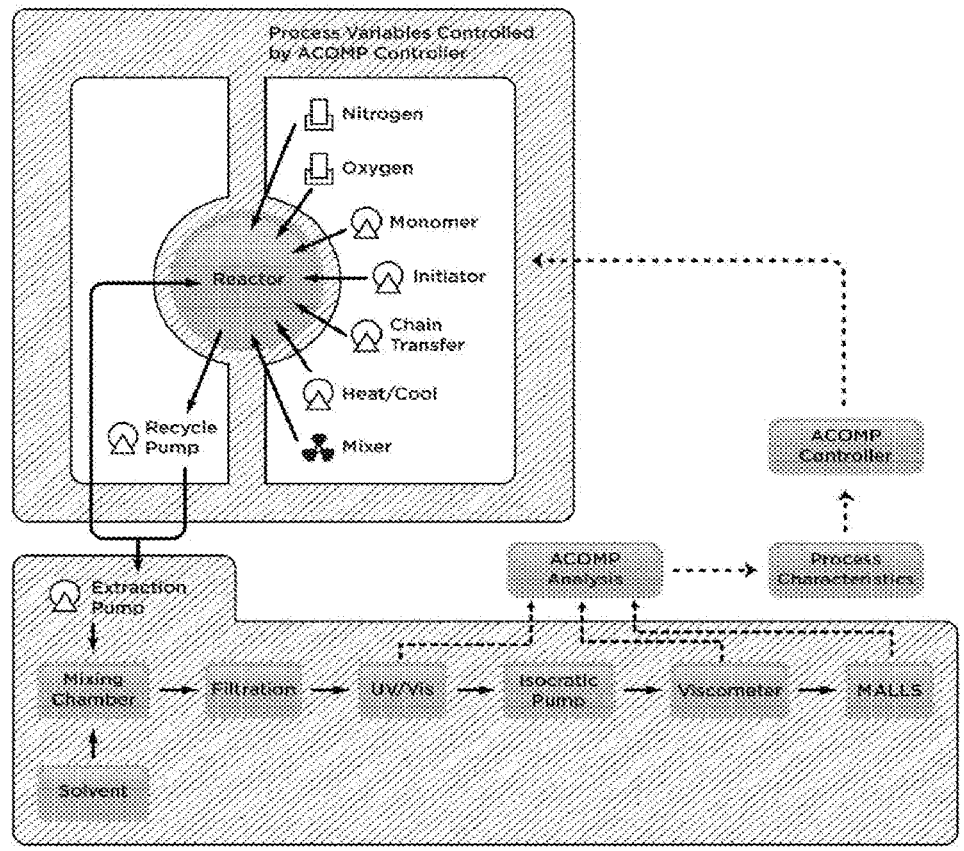
FIG. 9 illustrates an ACOMP system and method, according to an example embodiment of the present disclosure.

FIG. 9 illustrates an example ACOMP system and method, according to at least example embodiment of the present disclosure. The sample is continuously extracted from the reactor recirculation loop at a rate between 0.25 and 0.50 cm³/minute, depending on the experiment, by the Extraction Pump and is immediately quenched and diluted 80× with solvent (distilled water in these experiments) from the Solvent Pump, and homogenized in the Mixing Chamber, from which the sample flows through a 4 wavelength UV/Vis detector UV/Vis 159 detector by Gilson, (Middelton, WI), which continuously monitors the absorption of the monomer during the polymerization. Polymer conversion was calculated using the 245 nm wavelength. After flowing through the UV/Vis detector, a fraction of the sample stream is diverted by an Isocratic Pump to achieve a continuous and pulse free flow through the remaining detector train comprising a custom built Multi Angle Laser Light Scattering (MALS) detector, with four angles; 65°, 90°, 115°, 130°, and a custom built single capillary Viscometer. Based on the reaction and polymer characteristics determined by the ACOMP/CI the reactor temperature, nitrogen, monomer or initiator feeds can be adjusted to control the desired aspects of the polymerization; in this work the trajectories of the total $C_m$ and $M_w$ were controlled by manual active control using temperature and initiator flow in batch mode, and full active automatic control of $C_m$ and $M_w$ was achieved with monomer flow in semi-batch mode. There are many other specific embodiments for ACOMP systems beyond the one shown in FIG. 9. ACOMP systems having other configurations are within the spirit and scope of the present disclosure.

The delay from the reactor to the first detector, the UV, was 85 seconds. To correct for this delay time in the control computations, forward linear regression from the previous 30 seconds to the current instant, t, of real-time was used for $C_m$.

Use of UV absorption, viscosity, and MALS to compute monomer and polymer concentration, reduced viscosity, $\eta_r$, $M_w$ and z-average mean square radius of gyration $<S^2>z$ have been detailed in previous ACOMP publications. For the latter, the usual Zimm equation was used, where $I_R(\theta)$ is the excess Rayleigh scattering ratio from the polymer solution at scattering angle $\theta$ $$\frac{KC_p}{I_R(\theta)} = \frac{1}{M_w}\left(1 + \frac{q_s^2 <S^2>_z}{3}\right) + 2A_2C_p \quad (67)$$

where, Cp is polymer concentration, qs is the magnitude of the scattering vector $$q_s = \frac{4\pi n}{\lambda}\sin\left(\frac{\theta}{2}\right) \quad (68)$$

K is an optical constant, given for vertically polarized incident light by $$K = \frac{4\pi^2 n^2 (dn/dC_p)^2}{N_A \lambda^4} \quad (69)$$

where $dn/dC_p$ is the differential index of refraction for the polymer in a solvent of refractive index n, $N_A$ is Avogadro's number and $\lambda$, is the vacuum wavelength of the incident laser. For Am in water dn/dc=0.181 cm³/g was used, n=1.333, and λ=660 nm from a 35 mW Laser Max linearly polarized miniature diode laser. (see Zimm, B. H. The Scattering of Light and the Radial Distribution Function of High Polymer Solutions. *J. Chem. Phys.* 1948, 16, 1093-1099; Zimm, B. H. Apparatus and Methods for Measurement and Interpretation of the Angular Variation of Light Scattering; Preliminary Results on Polystyrene Solutions. *J. Chem. Phys.* 1948, 16, 1099-1115.)

In equation 67, $A_2$ is a complex average of the second virial coefficient. It was found on polyacrylamide end products to be $3.29 \times 10^{-4}$ cm³-Mole/g²+/−20% and was only weakly dependent on $M_w$, and was hence used as a constant correction factor. The maximum concentration of pAm in the detector train was $4 \times 10^{-4}$ g/cm³, which leads to a correction factor in equation 72 of $2A_2M_wC_p \sim 0.26$, for a value of $M_w \sim 10^6$ g/mole in the estimate. With an error bar of 20% on $A_2$ this leads to a maximum systematic error of 5% for Mw at maximum concentration and high $M_w$.

EXAMPLE 3

Examples of Active Manual Control

Both manual active and automatic control have been carried out on the APMT ACOMP/CI system. In this approach a $C_{m,t}(t)$ or $M_{w,t}(t)$ target trajectory in time was established and an operator manually operated the control variable to follow the target trajectory. This could be useful, for example, in an R&D laboratory or in a manufacturing facility where, for safety or other reasons, it is deemed better to keep a human operator involved. It also illustrates the use of temperature and initiator as control variables, not treated in the fully automatic described above.

Figure 10:
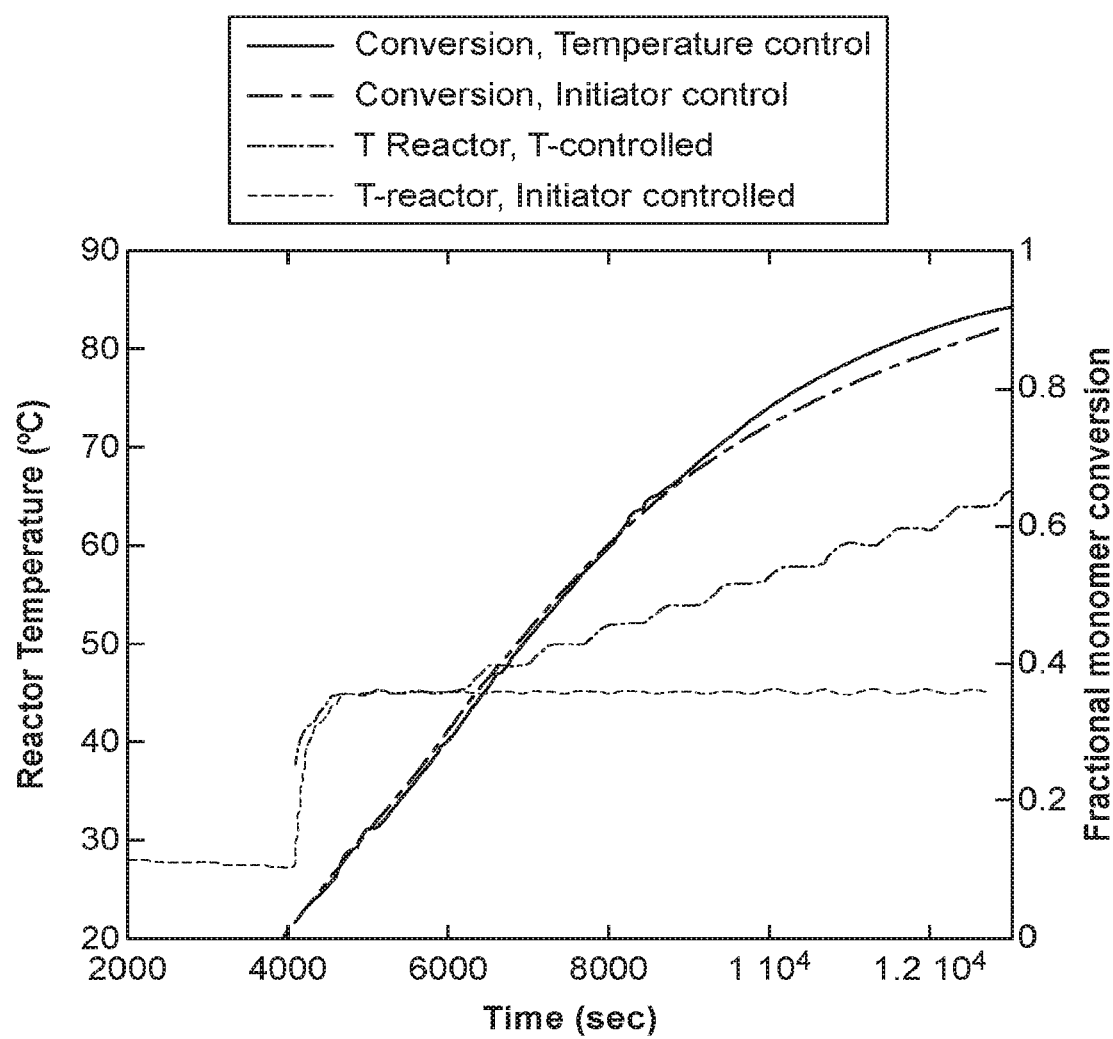
FIG. 10 illustrates an isomorphic conversion reaction pair in which the target trajectory was established by an Am polymerization at fixed initiator [KPS] with upward increments in T from 45° C. to 65° C., as shown by the dashed line; the second reaction followed this latter trajectory at fixed T=45° C. with active manual pumping of initiator into the reactor (the second reaction trajectory was within 3% of the first at all times), according to an example embodiment of the present disclosure.

FIG. 10 shows a target trajectory for Am free radical polymerization of 30 g of Am in a 1 L reactor and 0.45 g/L of KPS. In this the fractional conversion of Am, $C_m(t)/C_{m,o}$, was the target trajectory, where $C_{m,o}$ is the starting concentration of Am. The target trajectory was obtained by increasing the reactor temperature in steps at intervals from 45° C. to 62° C. over the course of about 8,000 s. The subsequent reaction, whose goal was to follow the control trajectory, $C_m(t)/C_{m,o}$, was carried out isothermally at 45° C. and initiator was added via a pump whose flow rate was controlled at the discretion of the operator. The operator managed to control the monomer concentration (shown as fractional conversion) to within 3% of the model path. These two reactions can be termed an 'isomorphic reaction pair' for conversion in temperature and initiator. 'Isomorphic' indicates that the trajectories are (essentially) the same, whereas temperature and initiator are two different control variables to reach the same trajectory.

Figure 11:
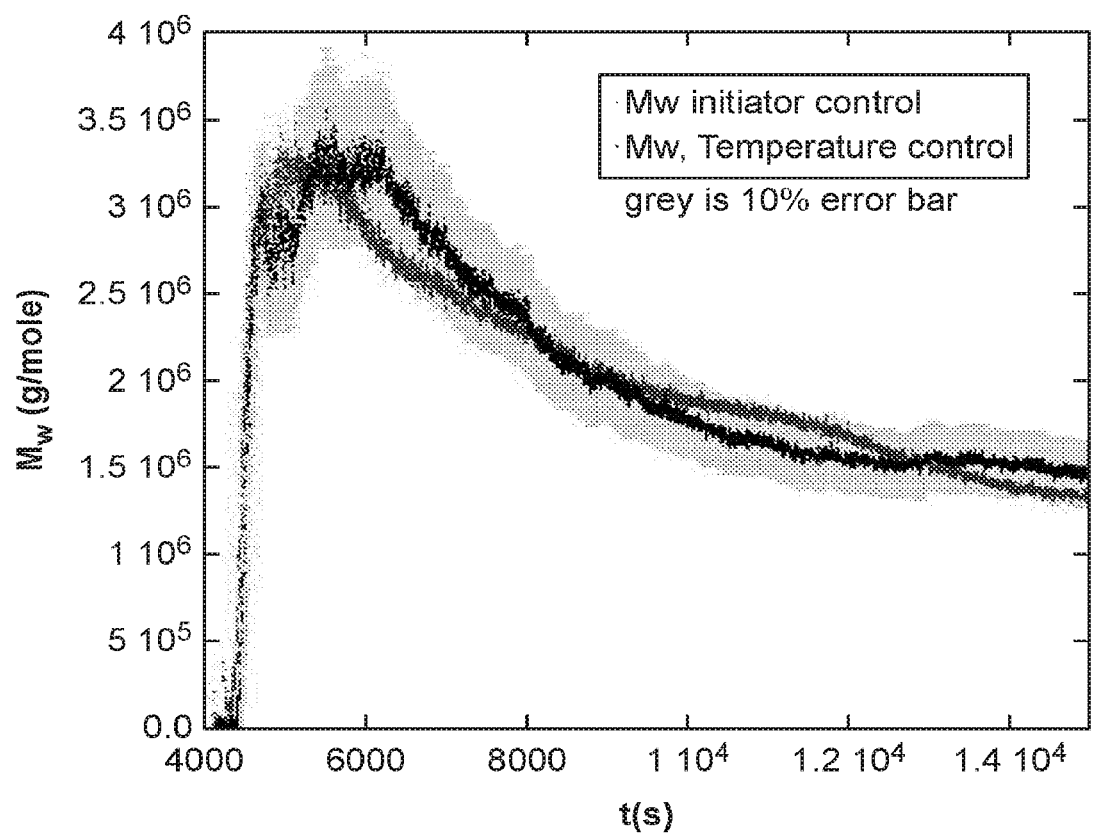
FIG. 11 illustrates an isomorphic $M_w$ reaction pair in which the target trajectory was established by an Am polymerization at fixed initiator [KPS] with upward increments in T from 45° C. to 65° C. The second reaction followed this latter at fixed T=45° C. with active manual pumping in initiator into the reactor. The second reaction trajectory was within 10% of the first at all times, according to an example embodiment of the present disclosure.

FIG. 11 shows an isomorphic reaction pair for $M_w$ in temperature and initiator. The control trajectory shows the $M_w$ produced from the stepped temperature model reaction of FIG. 10. The second reaction intended to follow the first was isothermal, held at 45° C., with initiator flow at the discretion of the operator. FIG. 11 shows the trajectory of the latter was followed within 10% of the control trajectory, shown by the grey shaded area.

It is noted that the monomer concentration path of FIG. 8 does not lead to an isomorphic reaction pair in Mw, as seen by an elementary consideration of the kinetics. If $C_m$ is the same in both reactions then, according to equation 3 (with [CTA]=0 here) p will be the same for both, which is required for $M_w$ to be the same for both, only if $k_p/k_t[R]$ is the same for both. But as T increases [R] increases sharply due to an exponential dependence of $k_d$ on temperature in equation 4. $k_p$ and $k_t$ are also temperature dependent so that p cannot be the same in the isothermal and temperature stepped reactions, and so a separate control reaction was required to produce the result in FIG. 11.

Figure 12:
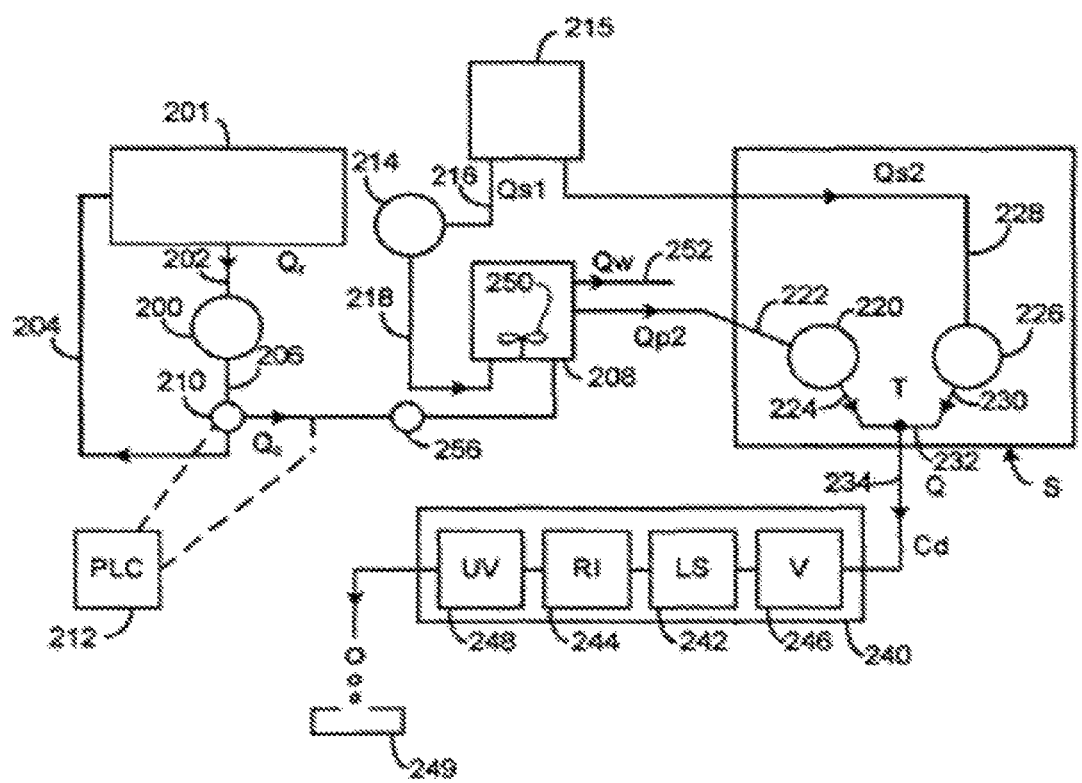
FIG. 12 illustrates an apparatus and system that includes, at least in part, the ACOMP method and system, according to an example embodiment of the present disclosure.

According to at least one aspect of the present disclosure, the techniques and methods described above may be used with the system and apparatus depicted in FIG. 12, or any portion thereof. As depicted in FIG. 12, a pump 200 is capable of handling high viscosities; pump 200 could be a gear, screw, or lobe pump. In the case of intermediate viscosities a peristaltic pump can also be used. Pump 200 extracts reactor fluid (having a solute concentration Cr) from reactor 201 via inlet line 202, at a flow rate of Qr. The majority of this flow recirculates back to reactor 201 via recycle line 204, whereas a desired fraction is delivered to the mixing chamber 208 via outlet 206 and/or diverter 210, at an average flow rate of Qc. Diverter 210 can be of either an active or passive type. A passive type can be simply a 'Y', where the lengths and inside diameters of the capillaries going from the 'Y' back to the reactor and into mixing chamber (208) controls the fluid flow split. An active diverter 210 might be a three-way solenoid valve, which normally delivers back to the reactor, but can be actuated by a programmable logic controller (PLC) 212 or similar electronic device, so as to periodically divert flow into mixing chamber 208, to achieve the average Qc. Pump 214 withdraws solvent from a solvent reservoir 215 at a rate Qs1 and delivers it to mixing chamber 208 via outlet 218, where both the reactor fluid and solvent are mixed, yielding a concentration of:

$$Cc = Cr\frac{Qc}{Qc + Qs1}. \quad (74)$$

At this point, a single stage mixer would simply feed the detector train 240 with fluid of concentration Cc, via line 222 and pump 220 at a flow rate of Qp2. In the two stage dilutor the compound secondary stage S contains an additional pump 226 that withdraws solvent from the solvent reservoir 215 at a rate Qs2 via line 228. Liquid streams from outlets 224 and 230, respectively) of pumps 220 and 226 are mixed with a very low volume microbore high pressure 'T-type' mixer 232 (e.g. Upchurch, Inc.), for example, or other passive or active mixing device. The flow rate from mixer 232 to detector train 240 via line 234 is hence Q=Qs2+Qp2, and the concentration of solute reaching detector train 240 is $$Cd = Cc \frac{Qp2}{Qp2 + Qs2}. \quad (75)$$

In this embodiment, the detector train 240 consists of a single or multi-angle light scattering detector 242 (LS), a refractometer 244 (RI), a viscometer 246 (V), and an ultraviolet/visible spectrophotometer 248 (UV). Other types and combinations of detectors are possible. For example, one or more of these measuring devices could be omitted. Fluid flowing out of detector train 240 goes to waste receptacle 249.

A non-recirculating embodiment would simply withdraw reactor fluid at a rate Qc and feed mixing chamber 208 directly. All other flow rates and concentrations remain as stated above. The main difference in this approach is that there will be a longer delay time between the sampling of a fluid element and its measurement by the detector train.

An active mixing element 250 in mixing chamber 208, such as a rotary vane turned by a miniature motor, is shown in FIG. 12. In the case of low viscosity fluids a passive element may be substituted. Mixing chamber 208 is normally vented to atmosphere so as to allow any bubbles coming from the reactor to be exhaled, and not drawn into the detector stream. An active or passive overflow 252 (O), and/or a level sensor, is preferably included in the apparatus (see FIG. 12). In the latter case, the level sensor will work in conjunction with the PLC 212 to control an active diverter 210. In this case, a solvent recirculation loop may be introduced, whereby a second active diverter, also operated by the PLC 212, will deliver, at intervals, the desired average Qs1. In the case of an active overflow without a level sensor, a certain amount of the mixed fluid in mixing chamber 208 will be pumped away by another low viscosity pump at a rate Qw, such that Qw+Qp2=Qc+Qs1. The volume V, of fluid in mixing chamber 208, together with the combined flow rate Qs1+Qc determines the average residence time $t_r$, (and hence response time of the chamber), of a fluid element in the mixing chamber, according to $$t_r = \frac{V}{Qc + Qs1} \quad (76)$$

$t_r$ sets the lower limit of the time for a reaction to occur that can still be monitored by ACOMP. Typically, $t_r$ is on the order of tens or hundreds of seconds. If the mixing chamber 208 is fed in pulses by an active diverter(s) 204 at intervals of Δt, then the mixing chamber 208 smooths out the discrete injections of reactor fluid and/or solvent as long as $t_r \gg \Delta t$. Commercial solenoid type diverters typically have response times on the order of milliseconds or tens of milliseconds, so the latter criterion is not hard to satisfy, and so the total solute concentration in mixing chamber 208 can be maintained constant, such that the detector signals do not display peaks or pulsations due to concentration fluctuations in mixing chamber 208.

Pumps 214, 220, 226 do not have to pump highly viscous liquids, pump 200 being the only high viscosity pump in the embodiment. Pump 214 does not have to work against any significant back-pressure since mixing chamber 208 is vented to atmosphere, and so a very inexpensive peristaltic, piston, diaphragm, or other type pump can be used. Pumps 220, 226 must be able to pump the low viscosity, mixed sample fluid against the detector train 240 back-pressure, typically on the order of 20 psi to 1000 psi. Many commercially available piston pumps exist for this application.

As shown in FIG. 12, conditioning module 256 is in line with outlet 206 of pump 200. Conditioning module 256 can perform functions such as heating the reactor fluid to evaporate solvent and/or monomer, or filtering the reactor fluid. Conditioning module 256 can also be placed at other points in the diagram, such as at the outlet 218 of mixing chamber 208.

STATEMENTS OF THE DISCLOSURE INCLUDE

Statement 1: A method for producing multimodal polymers in a single reaction vessel, the method comprising: generating polymer reactions in at least two stages in a reaction vessel to produce a multimodal polymer; monitoring at least one reaction characteristic in at least one stage; actively controlling the development of a mode by modifying at least one process control variable, based on the at least one monitored reaction characteristic, during the production of polymer in at least one of the at least two stages.

Statement 2: A method according to Statement 1, further comprising determining a reaction trajectory based on the at least one monitored reaction characteristic, wherein the process control variable is modified based on the reaction trajectory determination in order to follow a target trajectory.

Statement 3: A method according to Statement 1 or Statement 2, further comprising determining an optimal cross-over second target trajectory associated with the changeover of a continuous reactor from the development of a first mode to a second mode; and actively controlling the development of a second mode by modifying at least one process control variable, wherein the process control variable is modified based on the second target trajectory.

Statement 4: A method according to Statement 2 or Statement 3, wherein the reaction characteristic on which a target trajectory is based is molecular weight.

Statement 5: A method according to Statement 2 or Statement 3, wherein the reaction characteristic on which a target trajectory is based is copolymer composition.

Statement 6: A method according to Statement 2 or Statement 3, wherein the reaction characteristic on which a target trajectory is based is intrinsic viscosity (IV).

Statement 7: A method according to any one of the preceding Statements 2-6, further comprising determining a plurality of reaction trajectories simultaneously, each of the plurality of reaction trajectories based on at least one monitored reaction characteristic.

Statement 8: A method according to any one of the preceding Statements 2-7, further comprising modifying one or more process control variables based on the plurality of reaction trajectories, such that the trajectory of a plurality of monitored reaction characteristics are controlled simultaneously.

Statement 9: A method according to any one of the preceding Statements 2-8, wherein the plurality of simultaneously controlled trajectories are selected from the group consisting of $M_w$, reduced viscosity, IV, conversion, monomer and polymer concentrations, comonomer composition, branching, degree of hydrolysis, and chemical substitution.

Statement 10: A method according to any one of the preceding Statements 1-9, wherein actively controlling comprises automatic active control.

Statement 11: A method according to any one of the preceding Statements 1-10, wherein actively controlling comprises manual active control.

Statement 12: A method according to any one of the preceding Statements 1-11, wherein actively controlling comprises computationally assisted active control.

Statement 13: A method according to any one of the preceding Statements 1-12, wherein at least one or more of the at least two stages comprises a form of controlled radical polymerization.

Statement 14: A method according to any one of the preceding Statements 1-13, wherein the multimodal polymer comprises a multimodal stimuli responsive polymer.

Statement 15: A method according to any one of the preceding Statements 1-14, wherein the characteristic of the mode is selected from the group consisting of $M_w$, reduced viscosity, conversion, monomer and polymer concentrations, comonomer composition, branching, degree of hydrolysis, and chemical substitution.

Statement 16: A method according to any one of the preceding Statements 1-15, wherein the monitoring of at least one reaction characteristic comprises measuring at least one selected from the group consisting of Raman scattering, infra-red spectroscopy, refractive index, ultra-violet absorption, conductivity, optical activity, circular dichrosim, circular birefringence, NMR, total intensity light scattering, multi-angle total intensity light scattering, dynamic light scattering, capillary type viscometry, simultaneous low and high shear viscosity measurements.

Statement 17: A method according to any one of the preceding Statements 1-16, wherein the reaction characteristic is the conversion of comonomers monitored by a Raman scattering or infra-red spectroscopic probe in the reaction vessel.

Statement 18: A method according to any one of the preceding Statements 1-17, wherein the reaction characteristic is molecular weight monitored by total intensity light scattering or multi-angle total intensity light scattering.

Statement 19: A method according to any one of the preceding Statements 1-18, wherein the reaction characteristic is intrinsic viscosity (IV) monitored by a capillary type viscometer.

Statement 20: A method according to any one of the preceding Statements 1-19, wherein the reaction characteristic is branching monitored by simultaneous low and high shear viscosity measurements.

Statement 21: A method according to any one of the preceding Statements 1-20, wherein the reaction characteristic is branching monitored by simultaneous $M_w$ and IV measurements.

Statement 22: A method according to any one of the preceding Statements 1-21, wherein the process control variable is selected from the group consisting of temperature, stirring rate, mixing rate, agitation, introduction of monomers, introduction of comonomers, introduction of an initiator, introduction of a quencher, introduction of a branching agent, introduction of a cross-linking agent, introduction of a chain transfer agent, introduction of an inhibitor, introduction of air, introduction of $O_2$ gas, introduction of $N_2$ gas, introduction of argon gas, introduction of an acid, introduction of a base, introduction of a redox agent, and introduction of a catalyst.

Statement 23: A method according to any one of the preceding Statements 1-22, wherein monitoring at least one reaction characteristic comprises making a measurement at least once every 0.1 seconds to about once every 30 seconds.

Statement 24: A method for sequentially modifying a polymer, the method comprising: generating polymer reactions in at least two stages in a reaction vessel to produce a modified polymer; monitoring at least one reaction characteristic in at least one stage; actively controlling the development of a predetermined reaction characteristic by modifying at least one process control variable based on the at least one monitored reaction characteristic, during the production of the polymer in at least one of the at least two stages.

Statement 25: A method according to Statement 24, further comprising determining a reaction trajectory based on the at least one monitored reaction characteristic, wherein the process control variable is modified based on the reaction trajectory determination.

Statement 26: A method according to Statement 24 or Statement 25, wherein the predetermined reaction characteristic on which a target trajectory is based is molecular weight.

Statement 27: A method according to Statement 24 or Statement 25, wherein the predetermined reaction characteristic on which a target trajectory is based is copolymer composition.

Statement 28: A method according to Statement 24 or Statement 25, wherein the predetermined reaction characteristic on which a target trajectory is based is intrinsic viscosity (IV).

Statement 29: A method according to any one of the preceding Statements 24-28, further comprising determining a plurality of reaction trajectories simultaneously, each of the plurality of reaction trajectories based on at least one monitored reaction characteristic.

Statement 30: A method according to any one of the preceding Statements 24-29, further comprising modifying one or more process control variables based on the plurality of reaction trajectories, such that the trajectory of a plurality of monitored reaction characteristics are controlled simultaneously.

Statement 31: A method according to any one of the preceding Statements 24-30, wherein the plurality of simultaneously controlled trajectories are selected from the group consisting of $M_w$, reduced viscosity, IV, conversion, monomer and polymer concentrations, comonomer composition, branching, degree of hydrolysis, and chemical substitution.

Statement 32: A method according to any one of the preceding Statements 24-31, wherein actively controlling comprises automatic active control.

Statement 33: A method according to any one of the preceding Statements 24-32, wherein actively controlling comprises manual active control.

Statement 34: A method according to any one of the preceding Statements 24-33, wherein actively controlling comprises computationally assisted active control.

Statement 35: A method according to any one of the preceding Statements 24-34, wherein at least one or more of the at least two stages comprises a form of controlled radical polymerization.

Statement 36: A method according to any one of the preceding Statements 24-35, wherein the modified polymer comprises a stimuli responsive polymer.

Statement 37: A method according to any one of the preceding Statements 24-36, wherein the reaction characteristic is selected from the group consisting of $M_w$, reduced viscosity, conversion, monomer and polymer concentrations, comonomer composition, branching, degree of hydrolysis, and chemical substitution.

Statement 38: A method according to any one of the preceding Statements 24-37, wherein the monitoring of at least one reaction characteristic comprises measuring at least one selected from the group consisting of Raman scattering, infra-red spectroscopy, refractive index, ultra-violet absorption, conductivity, optical activity, circular dichrosim, circular birefringence, NMR, total intensity light scattering, multi-angle light scattering, capillary type viscometry, simultaneous low and high shear viscosity measurements.

Statement 39: A method according to any one of the preceding Statements 24-38, wherein the reaction characteristic on which a target trajectory is based is the conversion of comonomers monitored by a Raman scattering or infrared spectroscopic probe in the reaction vessel.

Statement 40: A method according to any one of the preceding Statements 24-39, wherein the reaction characteristic on which a target trajectory is based is molecular weight monitored by total intensity light scattering or multi-angle light scattering.

Statement 41: A method according to any one of the preceding Statements 24-40, wherein the reaction characteristic on which a target trajectory is based is intrinsic viscosity (IV) monitored by a capillary type viscometer.

Statement 42: A method according to any one of the preceding Statements 24-41, wherein the reaction characteristic on which a target trajectory is based is branching monitored by simultaneous low and high shear viscosity measurements.

Statement 43: A method according to any one of the preceding Statements 24-42, wherein the process control variable is selected from the group consisting of temperature, stirring rate, mixing rate, agitation, introduction of monomers, introduction of comonomers, introduction of an initiator, introduction of a quencher, introduction of a branching agent, introduction of a cross-linking agent, introduction of a chain transfer agent, introduction of an inhibitor, introduction of air, introduction of $O_2$ gas, introduction of $N_2$ gas, introduction of argon gas, introduction of an acid, introduction of a base, introduction of a redox agent, and introduction of a catalyst.

Statement 44: A method according to any one of the preceding Statements 24-43, wherein monitoring at least one reaction characteristic comprises making a measurement at least once every 0.1 seconds to about once every 30 seconds.

Statement 45: A method according to any one of the preceding Statements 24-44, wherein the modified polymer comprises a combination of multimodal and modified polymers.

Statement 46: A method according to any one of the preceding Statements 24-45, further comprising determining an optimal cross-over second target trajectory associated with the changeover of a continuous reactor from the development of a first mode to a second mode; and actively controlling the development of a second mode by modifying at least one process control variable, wherein the process control variable is modified based on the second target trajectory.

Statement 47: A device comprising: a reaction vessel configured to contain a polymer solution and generate polymer reactions in at least two stages; one or more detectors configured to monitor at least one reaction characteristic of the polymer solution contained in the reaction vessel; and a controller coupled with the reaction vessel and the one or more detectors, the controller configured to actively control the development of a predetermined reaction characteristic by modifying at least one process control variable based on the at least one reaction characteristic monitored by the detector.

Statement 48: A device according to Statement 47, wherein the controller further comprises an interface configured to allow an operator to cause the controller to actively control the development of a predetermined reaction characteristic.

Statement 49: A device according to Statement 47 or Statement 48, wherein the controller is further configured to determine a reaction trajectory based on the at least one reaction characteristic monitored by the detector, wherein the process control variable is modified based on the reaction trajectory determination.

Statement 50: A device according to any one of the preceding Statements 47-49, wherein the predetermined reaction characteristic on which a target trajectory is based is molecular weight.

Statement 51: A device according to any one of the preceding Statements 47-49, wherein the predetermined reaction characteristic on which a target trajectory is based is copolymer composition.

Statement 52: A device according to any one of the preceding Statements 47-49, wherein the predetermined reaction characteristic on which a target trajectory is based is intrinsic viscosity (IV).

Statement 53: A device according to any one of the preceding Statements 47-52, wherein the controller is further configured to determine a plurality of reaction trajectories simultaneously, each of the plurality of reaction trajectories based on at least one monitored reaction characteristic.

Statement 54: A device according to any one of the preceding Statements 47-53, wherein the controller is further configured to modify one or more process control variables based on the plurality of reaction trajectories, such that the trajectory of a plurality of monitored reaction characteristics are controlled simultaneously.

Statement 55: A device according to any one of the preceding Statements 47-54, wherein the plurality of simultaneously controlled trajectories are selected from the group consisting of $M_w$, reduced viscosity, IV, conversion, monomer and polymer concentrations, comonomer composition, branching, degree of hydrolysis, and chemical substitution.

Statement 56: A device according to any one of the preceding Statements 47-55, wherein the reaction characteristic is selected from the group consisting of $M_w$, reduced viscosity, conversion, monomer and polymer concentrations, comonomer composition, branching, degree of hydrolysis, and chemical substitution.

Statement 57: A device according to any one of the preceding Statements 47-56, wherein the one or more detectors is configured to measure at least one selected from the group consisting of Raman scattering, infra-red spectroscopy, refractive index, ultra-violet absorption, conductivity, optical activity, circular dichrosim, circular birefringence, NMR, total intensity light scattering, multi-angle light scattering, capillary type viscometry, simultaneous low and high shear viscosity measurements.

Statement 58: A device according to any one of the preceding Statements 47-57, wherein the reaction characteristic is the conversion of comonomers and the detector is a Raman scattering or infra-red spectroscopic probe coupled with the reaction vessel.

Statement 59: A device according to any one of the preceding Statements 47-58, wherein the reaction characteristic is molecular weight monitored by total intensity light scattering or multi-angle light scattering.

Statement 60: A device according to any one of the preceding Statements 47-58, wherein the reaction characteristic is intrinsic viscosity (IV) and the detector is a capillary type viscometer.

Statement 61: A device according to any one of the preceding Statements 47-58, wherein the reaction characteristic is branching monitored by simultaneous low and high shear viscosity measurements.

Statement 62: A device according to any one of the preceding Statements 47-61, wherein the process control variable is selected from the group consisting of temperature, stirring rate, mixing rate, agitation, introduction of monomers, introduction of comonomers, introduction of an initiator, introduction of a quencher, introduction of a branching agent, introduction of a cross-linking agent, introduction of a chain transfer agent, introduction of an inhibitor, introduction of air, introduction of $O_2$ gas, introduction of $N_2$ gas, introduction of argon gas, introduction of an acid, introduction of a base, introduction of a redox agent, and introduction of a catalyst.

Statement 63: A device according to any one of the preceding Statements 47-62, wherein the detector is configured to make a measurement at least once every 0.1 seconds to about once every 30 seconds.

Statement 64: A device according to any one of the preceding Statements 47-63, wherein the detector and controller are components of an ACOMP system.

Statement 65: A device according to any one of the preceding Statements 47-64, further comprising a second reaction vessel, wherein the reaction vessel and the second reaction vessel are each configured to generate polymer reactions in at least one of the at least two stages.

Statement 66: A device according to any one of the preceding Statements 47-65, wherein the controller if further configured to determine an optimal cross-over second target trajectory associated with the changeover of a continuous reactor from the development of a first mode to a second mode; and actively control the development of a second mode by modifying at least one process control variable, wherein the process control variable is modified based on the second target trajectory.

Statement 67: A method for producing multimodal polymers in a single reaction vessel, the method comprising: generating polymer reactions in at least two stages in a reaction vessel to produce a multimodal polymer; monitoring at least one reaction characteristic in at least one stage; actively controlling the development of a first mode by modifying at least one process control variable, based on the at least one monitored reaction characteristic, during the production of polymer in at least one of the at least two stages; determining a reaction trajectory based on the at least one monitored reaction characteristic, wherein the process control variable is modified based on the reaction trajectory determination in order to follow a first target trajectory; determining an optimal cross-over second target trajectory associated with the changeover of a continuous reactor from the development of a first mode to a second mode; and actively controlling the development of a second mode by modifying at least one process control variable, wherein the process control variable is modified based on the second target trajectory.

Statement 68: A method according to Statement 67, wherein the characteristic of the mode is selected from the group consisting of $M_w$, reduced viscosity, conversion, monomer and polymer concentrations, comonomer composition, branching, degree of hydrolysis, and chemical substitution.

Statement 69: A method according to Statement 67 or Statement 68, wherein the monitoring of at least one reaction characteristic comprises measuring at least one selected from the group consisting of Raman scattering, infra-red spectroscopy, refractive index, ultra-violet absorption, conductivity, optical activity, circular dichrosim, circular birefringence, NMR, total intensity light scattering, multi-angle total intensity light scattering, dynamic light scattering, capillary type viscometry, simultaneous low and high shear viscosity measurements.

Statement 70: A method according to any one of the preceding Statement 67-69, wherein the process control variable is selected from the group consisting of temperature, stirring rate, mixing rate, agitation, introduction of monomers, introduction of comonomers, introduction of an initiator, introduction of a quencher, introduction of a branching agent, introduction of a cross-linking agent, introduction of a chain transfer agent, introduction of an inhibitor, introduction of air, introduction of $O_2$ gas, introduction of $N_2$ gas, introduction of argon gas, introduction of an acid, introduction of a base, introduction of a redox agent, and introduction of a catalyst.

We claim:

1. A device comprising:
a reaction vessel configured to introduce and withdraw gases and chemical agents and to contain a polymer solution and generate polymer reactions in at least two stages to produce multimodal polymers comprising a first mode and a second mode, wherein sequential processes that add or change polymer features at each of the at least two stages are carried out in the reaction vessel, wherein each of the at least two stages yields polymers in each stage with distinct characteristics;
one or more detectors configured to monitor, via continuous model-independent measurements, at least one reaction characteristic of the polymer solution contained in the reaction vessel; and
a controller comprising a processor coupled with the reaction vessel and the one or more detectors, the controller configured to control development of the multi-modal polymers by modifying at least one process control variable and at least one reaction control variable simultaneously based on the at least one reaction characteristic monitored by the detector during the production of the polymer in at least one of the at least two stages,
wherein the controller is further configured to control a reaction trajectory to follow a first target trajectory based on the at least one reaction characteristic monitored by the detector, wherein at least one of the at least one process control variable and the at least one reaction control variable is modified based on the reaction trajectory;
wherein the controller is further configured to control the reaction trajectory to follow a cross-over second target trajectory associated with changeover from the development of the first mode to the second mode, and to control development of the second mode by modifying at least one of the at least one process control variable and at least one reaction control variable, wherein the process control variable is selected from the group consisting of temperature, stirring rate, mixing rate, and agitation, wherein the reaction control variable is selected from the group consisting of introduction of monomers, introduction of comonomers, introduction of an initiator, introduction of a quencher, introduction of a branching agent, introduction of a cross-linking agent, introduction of a chain transfer agent, introduction of an inhibitor, introduction of air, introduction of O2 gas, introduction of N2 gas, introduction of argon gas, introduction of an acid, introduction of a base, introduction of a redox agent, and introduction of a catalyst.

2. The device according to claim 1, wherein the controller further comprises an interface configured to allow an operator to cause the controller to control the development of a predetermined reaction characteristic.

3. The device according to claim 1, wherein the controller is further configured to:

determine a plurality of reaction trajectories simultaneously, each of the plurality of reaction trajectories based on at least one monitored reaction characteristic; and modify one or more process control variables based on the plurality of reaction trajectories, such that the trajectory of a plurality of monitored reaction characteristics are controlled simultaneously;

wherein the plurality of simultaneously controlled trajectories are selected from the group consisting of $M_w$, reduced viscosity, IV, conversion, monomer and polymer concentrations, comonomer composition, branching, degree of hydrolysis, and chemical substitution.

4. The device according to claim 1, wherein the detector and controller are components of an ACOMP system.

5. The device according to claim 1, wherein at least one of the at least one process control variable and at least one reaction control variable is modified based on the difference between the reaction trajectory and the cross-over second target trajectory.

6. The device according to claim 1, wherein the reaction vessel comprises a plurality of continuously stirred tank reactors (CSTRs) placed in serial flow to reach different stages in the controlled multi-stage process.

7. The device according to claim 1, wherein the reaction vessel comprises a first reactor for a first stage of reaction and a second reactor for a second stage of reaction.

8. The device according to claim 1, wherein the cross-over second target trajectory is determined offline and implemented online.

* * * * *